(12) United States Patent
Melicher et al.

(10) Patent No.: US 12,457,237 B2
(45) Date of Patent: Oct. 28, 2025

(54) AUTOMATED GENERATION OF BEHAVIORAL SIGNATURES FOR MALICIOUS WEB CAMPAIGNS

(71) Applicant: Palo Alto Networks, Inc., Santa Clara, CA (US)

(72) Inventors: William Russell Melicher, Sunnyvale, CA (US); Oleksii Starov, Sunnyvale, CA (US); Shresta Bellary Seetharam, Sunnyvale, CA (US); Shaown Sarker, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 142 days.

(21) Appl. No.: 18/104,058

(22) Filed: Jan. 31, 2023

(65) Prior Publication Data
US 2023/0254338 A1    Aug. 10, 2023

Related U.S. Application Data

(60) Provisional application No. 63/305,967, filed on Feb. 2, 2022.

(51) Int. Cl.
*H04L 9/40* (2022.01)
*G06F 16/951* (2019.01)
*G06F 21/55* (2013.01)
*G06F 21/56* (2013.01)

(52) U.S. Cl.
CPC ........ *H04L 63/1441* (2013.01); *G06F 16/951* (2019.01); *H04L 63/0245* (2013.01); *H04L 63/1416* (2013.01); *H04L 63/1425* (2013.01)

(58) Field of Classification Search
None
See application file for complete search history.

(56) References Cited

U.S. PATENT DOCUMENTS

| 9,444,835 | B2 * | 9/2016 | Thomas | H04L 63/1408 |
| 11,184,393 | B1 * | 11/2021 | Gendre | G06F 16/2379 |
| 11,470,044 | B1 * | 10/2022 | Briliauskas | G06N 20/00 |

(Continued)

OTHER PUBLICATIONS

Knowing Your Enemy: Understanding and Detecting Malicious Web Advertising. Li. ACM. (Year: 2012).*

(Continued)

*Primary Examiner* — Venkat Perungavoor
(74) *Attorney, Agent, or Firm* — Van Pelt, Yi & James LLP

(57) ABSTRACT

Techniques for automated generation of behavioral signatures for malicious web campaigns are disclosed. In some embodiments, a system/process/computer program product for automated generation of behavioral signatures for malicious web campaigns includes crawling a plurality of web sites associated with a malware campaign; determining discriminating repeating attributes (e.g., behavior related attributes, which can be determined using dynamic analysis, and static related attributes, which can be determined using static analysis) as malware campaign related footprint patterns, wherein the discriminating repeating attributes are not associated with benign web sites; and automatically generating a human-interpretable malware campaign signature based on the malware campaign related footprint patterns.

20 Claims, 21 Drawing Sheets

(56) References Cited

U.S. PATENT DOCUMENTS

| | | | | |
|---|---|---|---|---|
| 2011/0283361 | A1* | 11/2011 | Perdisci | G06F 21/56 726/24 |
| 2011/0289582 | A1* | 11/2011 | Kejriwal | H04L 63/14 726/22 |
| 2012/0278886 | A1* | 11/2012 | Luna | H04L 63/1408 726/22 |
| 2014/0317741 | A1* | 10/2014 | Be'ery | H04L 63/16 726/23 |
| 2016/0065600 | A1* | 3/2016 | Lee | H04L 63/1416 726/23 |
| 2017/0230390 | A1* | 8/2017 | Faulkner | H04L 67/02 |
| 2018/0324144 | A1* | 11/2018 | Shi | H04L 12/4641 |
| 2021/0097168 | A1* | 4/2021 | Patel | G06F 21/554 |
| 2021/0314353 | A1* | 10/2021 | Melson | H04L 67/02 |
| 2022/0038424 | A1* | 2/2022 | Liu | H04L 63/0236 |
| 2022/0164447 | A1* | 5/2022 | Yi | G06F 21/566 |

OTHER PUBLICATIONS

Cross-Layer Detection of Malicious Websites. Xu. ACM. (Year: 2013).*

Fredrikson et al., Synthesizing Near-Optimal Malware Specifications from Suspicious Behaviors, 2010 IEEE Symposium on Security and Privacy, IEEE Computer Society, 2010.

Starov et al., Betrayed by Your Dashboard: Discovering Malicious Campaigns via Web Analytics, Track: Security and Privacy on the Web, WWW 2018, Apr. 23-27, 2018, Lyon, France.

Starov et al., Detecting Malicious Campaigns in Obfuscated JavaScript with Scalable Behavioral Analysis, 2019 IEEE Security and Privacy Workshops (SPW), 2019, pp. 218-223.

Vadrevu et al., What You See is Not What You Get: Discovering and Tracking Social Engineering Attack Campaigns, IMC '19, Oct. 21-23, 2019, Amsterdam, Netherlands.

* cited by examiner

| Predicate Type | Properties | Extracted from | Source | Type |
|---|---|---|---|---|
| Traffic URL | URL of originating request | Responses Received | Crawler | Static |
| Traffic Domain | Host name of originating request | Responses Received | Crawler | Static |
| Traffic IP | IP of the server | Responses Received | Crawler | Static |
| Content Hash | SHA256 hash of response body | Responses Received | Crawler | Static |
| Alert | Alert type, alert text | Intercepted Alerts | Crawler | Static |
| HTML Attribute | Language and script attribute name, corresponding value of script tags | DOM Document Responses Received | Crawler | Static |
| HTML URL | Tag name, URL extracted from specific attribute (see Appendix A) | DOM Document Responses Received | Crawler | Static |
| HTML Domain | Tag name, host name of URL extracted from specific attribute (see Appendix A) | DOM Document Responses Received | Crawler | Static |
| HTML Text | Text content of length between 10 and 500 for HTML text tags except script and style | DOM Document Responses Received | Crawler | Static |
| API Call | API name, [parameter name, corresponding argument value, ...] | Visible V8 Log | Post-processor | Dynamic |

Table 1: Extracted static and dynamic predicates during data collection

FIG. 4D

| URL Verdict | No. of URLS | No. of Predicates |
|---|---|---|
| Benign | 1.7 million | 1.2 billion |
| Malicious | 1.1 million | 183 million |
| Unlabeled | 431 thousand | 147 million |
| Total | 3.3 million | 1.5 billion |

Table 2: Crawled URLs and collected predicates by verdict

| Type | No. of Predicates |
|---|---|
| Traffic URL | 95 million |
| Traffic Domain | 21 million |
| Traffic IP | 19 million |
| Content Hash | 76 million |
| Alert | 1 thousand |
| HTML Attribute | 2 million |
| HTML URL | 229 million |
| HTML Domain | 37 million |
| HTML Text | 162 million |
| API Call | 907 million |
| Total | 1.5 billion |

Table 3: Collected predicates by type

FIG. 4E

Algorithm 1: Ordering predicates to construct set of repeating discriminative predicates

Data: $P$, set of predicates
$F_{min}$, minimum positive count threshold
$C_{top}$, top predicates count threshold
Result: $D$, set of discriminative predicates
$D \leftarrow \emptyset$;
for each $p \in P$ do
    $U_{pos} \leftarrow \{u \mid \text{predicate p is observed on positive URL u}\}$;
    $U_{neg} \leftarrow \{u \mid \text{predicate p is observed on negative URL u}\}$;
    if $|U_{pos}| \leq F_{min}$ then
        continue;
    end
    if $|U_{neg}| > 0$ then
        continue;
    end
    $D \leftarrow D \cap p$
end
Sort $D$ by $|U_{pos}|$ ascending;
$D \leftarrow \{p \mid \text{predicate p is in top } C_{top} \text{ of D ordered}\}$

FIG. 4F

Algorithm 2: Generate signatures from the set of discriminative repeating predicates

Data: $D$, set of discriminate predicates
      $U_{min}$, minimum URL count threshold
      $P_{min}$, minimum predicate count threshold

Result: $G$, set of signatures generated for *each $d \in D$* do
    $U \leftarrow \{u \mid$ predicate d is observed on URL u$\}$;
    /* Signature to be constructed    */
    $S_G \leftarrow \emptyset$;
    /* URLs where predicate is observed */
    $O_U \leftarrow \emptyset$;
    for *each $u \in U$* do
        $P_u \leftarrow$
        $\{p \mid$ predicate p is observed on URL u and $p \in D\}$;

$O_U \leftarrow O_U \cup u$;
        if $S_G$ is $\emptyset$ then
            $S_G \leftarrow P_u$;
        else
            $S_G \leftarrow S \cap P_u$;
        end
    end
    if $|O_U| < U_{min}$ then
        continue;
    end
    if $|S_G| < P_{min}$ then
        continue;
    end
    $G \leftarrow G \cup S_G$;
end

FIG. 4G

| Process | Time Taken | Data Used |
|---|---|---|
| Discriminating predicate set construction | 1 min 39 sec | 1.5 billion predicates |
| Synthesizing signatures | 20 min 32 sec | 1.5 million URL-predicate pairs |
| Labeled application | 1 min 53 sec | 595 thousand labeled URLs |
| Unlabeled application | 1 min 21 sec | 431 thousand unlabeled URLs |

Table 4: Time taken to perform each stage of our signature generation and application (on a machine with 12-core Intel i7 3.2GHz processor and 32GB memory)

FIG. 4J

| Type | Count |
|---|---|
| HTML URL | 10,928 |
| HTML Text | 6,032 |
| Traffic URL | 3,088 |
| API Call | 3,019 |
| HTML Domain | 695 |
| Traffic Domain | 324 |
| Total | 24,086 |

Table 5: Breakdown of predicate types in generated signatures

FIG. 4K

| Process | Generated From (percentiles) | Applied on (percentiles) |
|---|---|---|
| Parameter selection (see §5.4) | First to 80th | 81st to 90th |
| Labeled evaluation (see §6.1) | First to 90th | 91st to 100th |
| Labeled evaluation - regression (see §6.1) | First to 90th | First to 90th |
| Unlabeled evaluation (see §6.2) | First to 90th | Unlabeled data* |

Table 6: Breakdown of labeled predicates used for each process by percentile slices (* in unlabeled evaluation, we applied the signatures generated from labeled data to unlabeled data)

FIG. 4L

| Rank | Signature Campaign Type | URL Matches |
|---|---|---|
| 1 | Fake domain sale scam | 8,017 |
| 2 | Phishing targeting Chinese visitors | 2,823 |
| 3 | Malware delivery | 2,768 |
| 4 | Fake domain sale scam | 772 |
| 5 | Facebook phishing | 735 |
| 6 | Phishing selling software solutions (fakes DomainOverwatch approval) | 502 |
| 7 | Malware delivery | 483 |
| 8 | Phishing selling software solutions (fakes DomainOverwatch approval) | 431 |
| 9 | Prize winning scam | 416 |
| 10 | Malware manipulating browsing history | 332 |

Table 7: Top 10 campaign signatures with highest toxicity

FIG. 4M

| Campaign Category | URLS |
|---|---|
| Scam | 124 |
| Phishing | 59 |
| Malware | 2 |
| Total | 185 |

Table 8: Breakdown of manual analysis of URLs not flagged by VirusTotal

FIG. 4N

| Detection Category | No. of Requests | No. of Users | URLs |
|---|---|---|---|
| VirusTotal | 29,680 | 1,398 | 60 |
| Manual Inspection | 50,792 | 3,738 | 72 |
| Total | 80,472 | 5,136 | 132 |

Table 9: Impact of detected URLs from unlabeled data over enterprise customer request logs since September 2021

FIG. 4O

```
1  [
2      // Redacted for brevity
3      {
4        "type": "api_call",
5        "properties": [
6          "Window.atob",
7          "\"OTQ1NThOQVVTQ0EyMTgzMDU3NzgwNzAwMDBDSA==\" "
8        ]
9      },
10     {
11       "type": "api_call",
12       "properties": [
13         "Document.getElementById",
14         "\"clickjack-button-wrapper-5\""
15       ]
16     },
17     {
18       "type": "api_call",
19       "properties": [ "Window.setTimeout", "\"
    ↪ clickjack_hider()\",5000" ]
20     }
21  ]
```

Listing 1: Signature identifying clickjacking campaign

FIG. 4P

```
1   [
2       // Redacted for brevity.
3       {
4           "type": "api_call",
5           "properties": [
6               "Element.setAttribute",
7               "\"value\",\"http://dolohen.com/afu.php?zoneid
                    =2468047\" "
8           ]
9       },
10      {
11          "type": "html_url",
12          "properties": [
13              "form",
14              "http://dolohen.com/?z=2468047\u0026syncedCookie=
                    true"
15          ]
16      },
17      {
18          "type": "api_call",
19          "properties": [
20              "History.pushState",
21              "#N, \"Redirect\", \"/afu.php?zoneid=2468047\u0026var
                    =2468047\u0026rid=3V3cJ5LEtuPAKYxz6tD_Kw%3D%3D\" "
22          ]
23      },
24      {
25          "type": "traffic_url",
26          "properties": ["http://dolohen.com/afu.php?zoneid
                    =2468047" ]
27      },
28      {
29          "type": "traffic_url",
30          "properties": ["http://dolohen.com/?z=2468047\
                    u0026syncedCookie=true" ]
31      },
32      { "type": "html_domain", "properties": [ "form", "
                    dolohen.com" ] }
33  ]
```

Listing 2: Signature identifying JS malware manipulating browsing history

FIG. 4Q

A HTML URL & Domain Predicate Sources

| Tag Name | Attribute Name |
|---|---|
| script | src |
| a | href |
| form | action |
| img | src |
| object | data |
| iframe | src |
| frame | src |
| link | href |

Table 10: HTML tags and corresponding attributes for extraction of HTML URL and Domain predicates

FIG. 4R

AUTOMATED GENERATION OF BEHAVIORAL SIGNATURES FOR MALICIOUS WEB CAMPAIGNS

CROSS REFERENCE TO OTHER APPLICATIONS

This application claims priority to U.S. Provisional Patent Application No. 63/305,967 entitled AUTOMATED GENERATION OF BEHAVIORAL SIGNATURES FOR MALICIOUS WEB CAMPAIGNS filed Feb. 2, 2022, which is incorporated herein by reference for all purposes.

BACKGROUND OF THE INVENTION

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

BRIEF DESCRIPTION OF THE DRAWINGS

Various embodiments of the invention are disclosed in the following detailed description and the accompanying drawings.

FIG. 4D illustrates Table 1 that includes extracted static and dynamic predicates during data collection in accordance with some embodiments.

FIG. 4E illustrates Table 2 that includes crawled URLs and collected predicates by verdict and Table 3 that includes collected predicates by type in accordance with some embodiments.

FIG. 4F illustrates an algorithm for ordering predicates to construct a set of repeating discriminative predicates in accordance with some embodiments.

FIG. 4G illustrates an algorithm for generating signatures from the set of discriminative repeating predicates in accordance with some embodiments.

FIG. 4J illustrates Table 4 that indicates the time taken to perform each stage of the signature generation and application in accordance with some embodiments.

FIG. 4K illustrates a Table 5 that includes a breakdown of predicate types in generated signatures in accordance with some embodiments.

FIG. 4L illustrates Table 6 that includes a breakdown of labeled predicates used for each process by percentile slices in accordance with some embodiments.

FIG. 4M illustrates a Table 7 that includes the top ten campaign signatures with the highest toxicity in accordance with some embodiments.

FIG. 4N illustrates a Table 8 that includes a breakdown of manual analysis of URLs not flagged by VirusTotal in accordance with some embodiments.

FIG. 4O illustrates a Table 9 that provides an impact of detected URLs from unlabeled data over enterprise customer request logs (e.g., since September 2021) in accordance with some embodiments.

FIG. 4P provides a Listing 1 that displays a shortened version of our generated signature that successfully identified a clickjacking campaign in accordance with some embodiments.

FIG. 4Q provides a Listing 2 that displays a shortened version of our generated signature that successfully identified a JavaScript (JS) malware campaign (e.g., manipulating browsing history) in accordance with some embodiments.

FIG. 4R illustrates a Table 10 that includes HTML, tags and corresponding attributes for extraction of HTML URL and Domain predicates in accordance with some embodiments.

DETAILED DESCRIPTION

Figure 1:
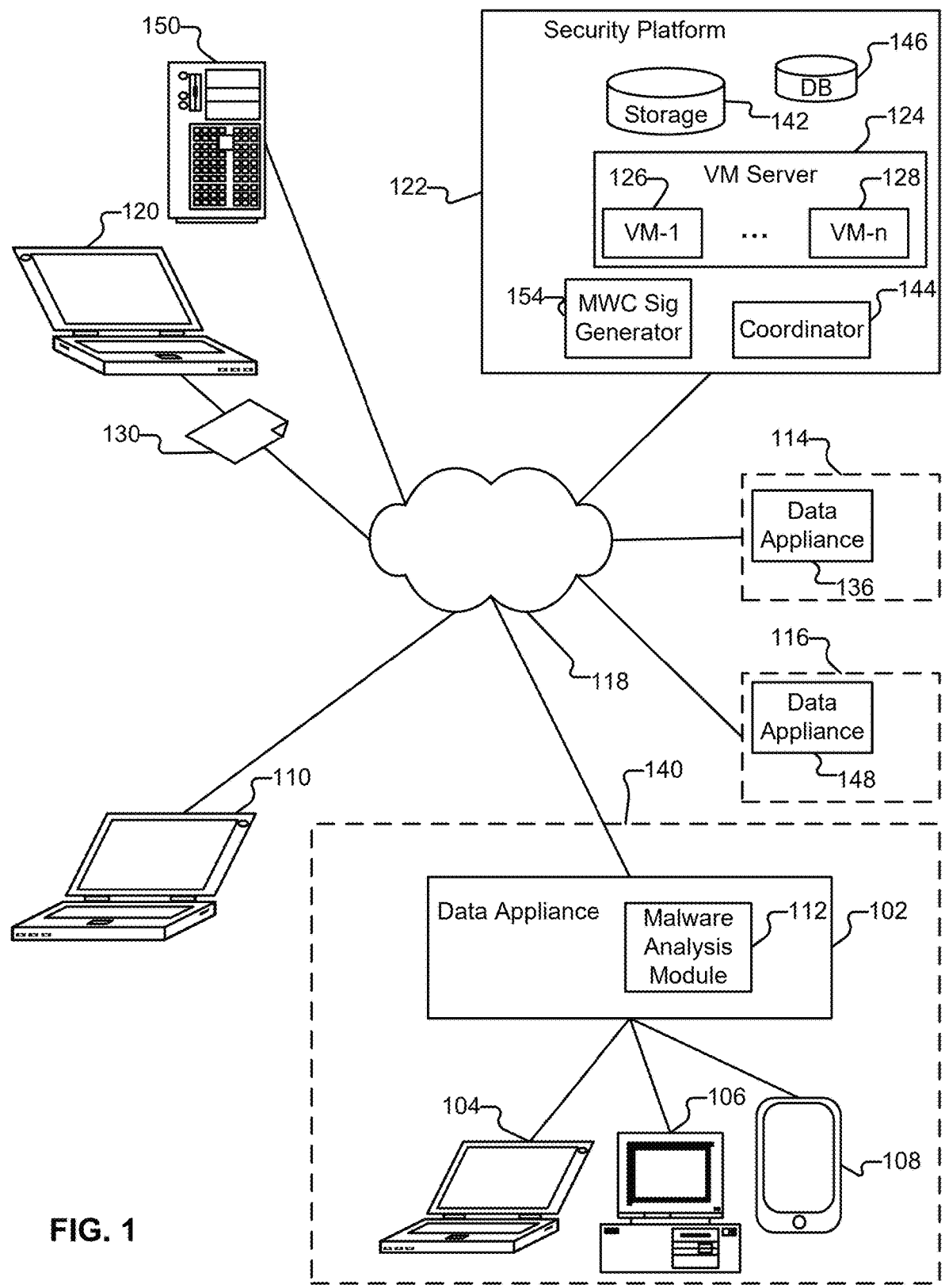
FIG. 1 illustrates an example of an environment in which malicious applications ("malware") are detected and prevented from causing harm.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)) as well as CN Series container next generation firewalls. For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Overview of Techniques for Automated Generation of Behavioral Signatures for Malicious Web Campaigns Generally, existing anti-malware security solutions often fail to detect new malware or new malware variants based on malware signatures (e.g., predefined patterns, such as for web-based malware). Specifically, existing anti-malware security solutions generally fail to detect malware on the web (e.g., web-based malware) with a low false positive rate (e.g., less than 1% of a false positive rate (FPR)). These shortcomings associated with existing malware solutions expose enterprises to significant security risks due to the failure to accurately detect such new malware or new malware variants on the web.

Thus, what are needed are anti-malware security solutions that can efficiently and effectively detect malware on the web.

Accordingly, new and improved techniques for automated generation of behavioral signatures for malicious web campaigns are disclosed.

Web-based malicious campaigns target internet users across multiple domains to launch various forms of social engineering attacks such as scams, phishing, and clickjacking to deliver malware. Previous research exploring the detection of such malicious campaigns involves applying supervised or unsupervised learning techniques on highly correlated campaign data and producing opaque machine learning models that are hard to diagnose and require a significant amount of manual tuning.

In some embodiments, the disclosed techniques for automated generation of behavioral signatures for malicious web campaigns include an automated web-based malicious campaign detection system that can detect malicious campaigns at scale and produce easily understandable signatures representing their actual behavior. Specifically, the disclosed system can synthesize signatures that include both static and dynamic behaviors with labeled uncategorized data through repeating behaviors of web pages belonging to malicious web campaigns. For example, the effectiveness of the disclosed system was demonstrated by generating 379 campaign signatures that were matched across 36,427 unique labeled malicious URLs with an extremely low false-positive rate (0.008%). Further, the generated signatures were applied to detect URLs belonging to campaigns in the wild and identified 471 URLs, which were verified by VirusTotal (VT) and manual inspection. The results provide valuable insight into web-based malicious campaign detection and can be utilized to improve existing defenses against them by enhancing, for example, blocking lists or augmenting other detection systems as will be further described below.

In some embodiments, a system/process/computer program product for automated generation of behavioral signatures for malicious web campaigns includes crawling a plurality of web sites associated with a malware campaign; determining discriminating repeating attributes (e.g., behavior related attributes, which can be determined using dynamic analysis, and static related attributes, which can be determined using static analysis) as malware campaign related footprint patterns, wherein the discriminating repeating attributes are not associated with benign web sites; and automatically generating a human-interpretable malware campaign signature based on the malware campaign related footprint patterns (e.g., the human-interpretable malware campaign signature can detect that another web site is associated with the malware campaign even if the another web site includes content that is encrypted and/or obfuscated).

For example, the automatically generated human-interpretable malware campaign signature can be applied to identify another malicious web site belonging to the malware campaign by applying the malware campaign signature on both labeled and unlabeled Uniform Resource Links (URLs) associated with a plurality of web sites.

In an example implementation, a browser environment (e.g., a Chromium browser environment or another browser environment) can be instrumented for tracking dynamic behaviors. Specifically, the instrumented browser environment can be configured to crawl a plurality of uncategorized, labeled Uniform Resource Links (URLs) to generate malware campaign signatures. Such malware campaigns can be associated with a set of domains (e.g., URLs) used by an attacker for a malicious activity, such as phishing, Uniform Resource Link (URL) delivered malware, and/or other malicious related activity.

In some embodiments, a system/process/computer program product for automated generation of behavioral signatures for malicious web campaigns further includes periodically updating the human-interpretable malware campaign signature for the malware campaign.

In some embodiments, a system/process/computer program product for automated generation of behavioral signatures for malicious web campaigns further includes generating a new human-interpretable malware campaign signature for a new malware campaign.

In some embodiments, a system/process/computer program product for automated generation of behavioral signatures for malicious web campaigns further includes distributing the malware campaign signature to a firewall. The firewall can be configured to apply the malware campaign signature based on monitored network traffic activity. As such, a visited web site can be detected to be associated with the malware campaign based on a threshold match with the malware campaign signature.

As another example, the malware campaign signature can be applied by a firewall (e.g., or any security entity/platform) for a match on a candidate web page. Specifically, predetermined behavior predicates can be extracted from the web page to determine whether all or a threshold number (e.g., a fuzzy match) of the behavior predicates in the malware campaign signature are present in the set of extracted predicates from the web page. If a match is detected, then the candidate web page is determined to be associated with the malware campaign. As such, the firewall can then perform an action based on detecting that the web page is associated with the malware campaign (e.g., block access to the candidate web page, generate an alert, log an attempt to access the candidate web page, quarantine an endpoint associated with a request for the candidate web page, and/or another action can be performed).

Moreover, unlike existing signatures implemented, for example, as YARA rules, minor changes to the candidate web page generally would not result in mismatch to malware campaign signatures.

In addition, the disclosed techniques for automated generation of behavioral signatures for malicious web campaigns can be used to apply a plurality of human-interpretable malicious campaign signatures to prior unknown data for extended detection from non-clustered and non-categorized labeled data.

As yet another example, the disclosed techniques for automated generation of behavioral signatures for malicious web campaigns can be used to automatically extract signatures from malware to identify future malware samples of the same type. In an example implementation, a security web crawler can be used to visit a set of known malicious web pages and a set of known benign web pages. A signature generation engine can then be used to extract a plurality of potential signatures from both the benign and malicious sets. A signature can be any observable property of the web page, such as specific text in the HTML on the web page (e.g., "you've been selected as a winner!"), or a specific URL that is dynamically loaded. Next, a list of signatures can be refined that identifies malware by selecting the signatures that are present on the malicious web sites but not on benign sites. As will be further described below, the processing to generate the refined signatures uses logical induction to create sets of predicates that identify malicious web content.

As such, the disclosed techniques for automated generation of behavioral signatures for malicious web campaigns improve on existing approaches to web-based malware detection by increasing the true positive detection rate while having minimal false positives (e.g., less than a 0.1% FPR). For example, when compared to machine learning (ML) approaches, which generally have some level of false positives, the disclosed techniques can be tuned to have zero or near zero false positives, because the signatures are constructed such that they do not detect known benign content. Finally, the disclosed techniques can be used to extract information even from relatively small malicious data sets (e.g., on the order of tens of malicious samples), whereas other automated machine learning approaches often need thousands of instances of malware samples to learn to detect them.

As example use cases, the disclosed techniques for automated generation of behavioral signatures for malicious web campaigns can be used to analyze malware in a matrix security crawler to detect malware and return verdicts to facilitate malware detection for various security solutions, such as for URL filtering, DNS security, and cloud-based URL analysis.

Accordingly, new and improved security solutions that facilitate automated generation of behavioral signatures for malicious web campaigns using a security platform (e.g., a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) are disclosed in accordance with some embodiments.

These and other embodiments and examples for automated generation of behavioral signatures for malicious web campaigns will be further described below.

Example System Architectures for Automated Generation of Behavioral Signatures for Malicious Web Campaigns Accordingly, in some embodiments, the disclosed techniques include providing a security platform (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, such as PANOS executing on a virtual/physical NGFW solution commercially available from Palo Alto Networks, Inc. or another security platform/NFGW, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) configured to provide DPI capabilities (e.g., including stateful inspection) of, for example, applying the disclosed techniques for automated generation of behavioral signatures for malicious web campaigns, as further described below.

FIG. 1 illustrates an example of an environment in which malicious applications ("malware") are detected and prevented from causing harm. As will be described in more detail below, malware classifications (e.g., as made by security platform 122) can be variously shared and/or refined among various entities included in the environment shown in FIG. 1. And, using techniques described herein, devices, such as endpoint client devices 104-110, can be protected from such malware (e.g., including previously unknown/new variants of malware, such as C2 malware).

"Malware" as used herein refers to an application that engages in behaviors, whether clandestinely or not (and whether illegal or not), of which a user does not approve/would not approve if fully informed. Examples of malware include ransomware, Trojans, viruses, rootkits, spyware, hacking tools, etc. One example of malware is a desktop/mobile application that encrypts a user's stored data (e.g., ransomware). Another example of malware is C2 malware, such as similarly described above. Other forms of malware (e.g., keyloggers) can also be detected/thwarted using the disclosed techniques for sample traffic based self-learning malware detection as will be further described herein.

Techniques described herein can be used in conjunction with a variety of platforms (e.g., servers, computing appliances, virtual/container environments, desktops, mobile devices, gaming platforms, embedded systems, etc.) and/or for automated detection of a variety of forms of malware (e.g., new and/or variants of malware, such as C2 malware, etc.). In the example environment shown in FIG. 1, client devices 104-108 are a laptop computer, a desktop computer, and a tablet (respectively) present in an enterprise network 140. Client device 110 is a laptop computer present outside of enterprise network 140.

Data appliance 102 is configured to enforce policies regarding communications between client devices, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, web site content, files exchanged through instant messaging programs, and/or other file transfers. In some embodiments, data appliance 102 is also configured to enforce policies with respect to traffic that stays within enterprise network 140.

Figure 2A:
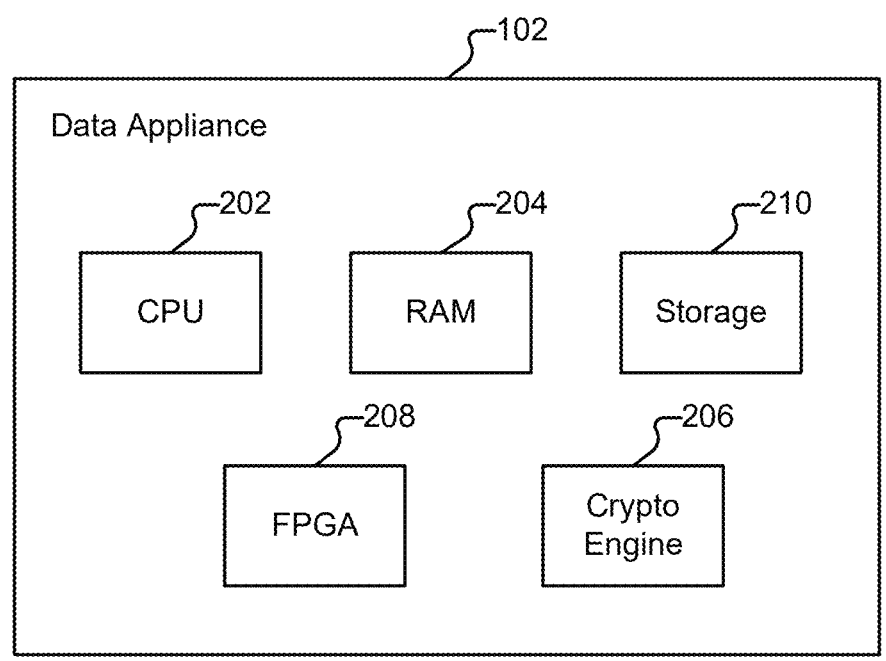
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 140 and implementing disclosed techniques. Examples of such information include application identifiers, content identifiers, user identifiers, requested URLs, IP address mappings, policy and other configuration information, signatures, hostname/URL categorization information, malware profiles, and machine learning (ML) models (e.g., such as for sample traffic based self-learning malware detection, including C2 ML models, as further described herein). Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device (e.g., client device 104 or client device 110) by software executing on the client device.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

Figure 2B:
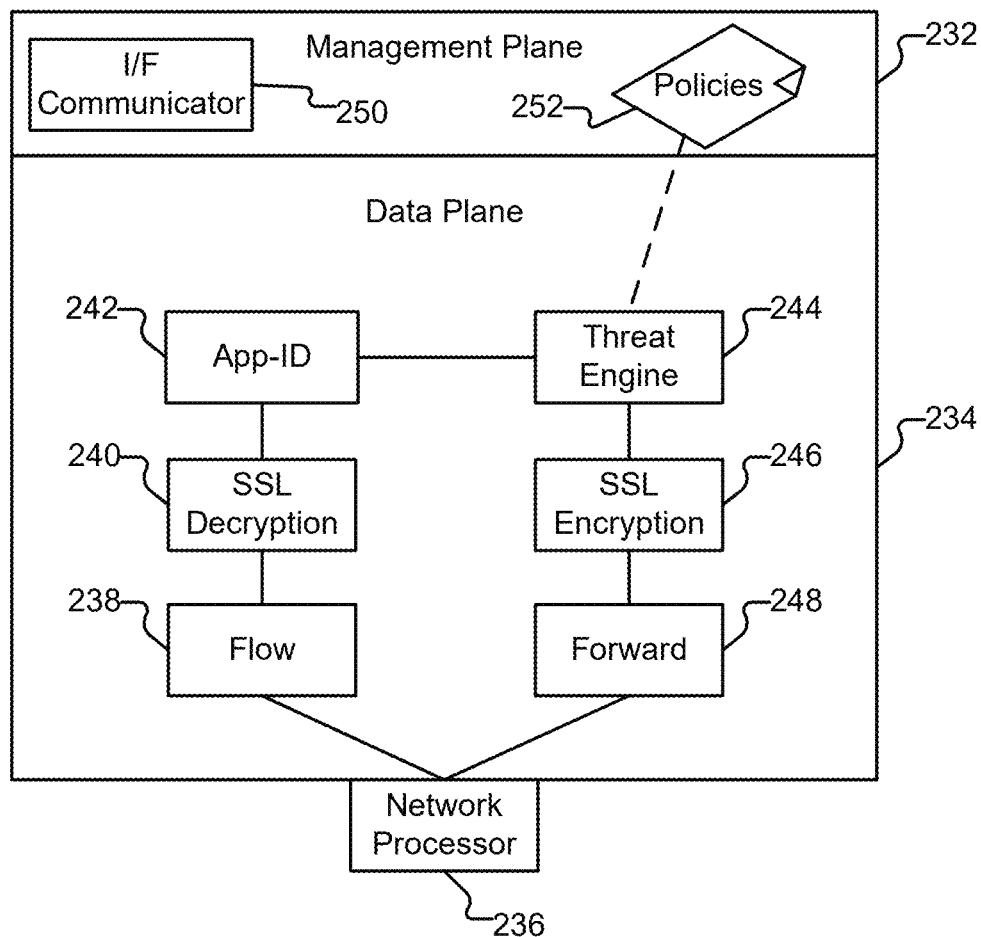
FIG. 2B is a functional diagram of logical components of an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 140. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, such as a web browsing session, the identified application can change, and such changes will be noted by data appliance 102. For example, a user may initially browse to a corporate Wiki (classified based on the URL visited as "Web Browsing—Productivity") and then subsequently browse to a social networking site (classified based on the URL visited as "Web Browsing—Social Networking"). Distinct types of protocols have corresponding decoders.

Based on the determination made by application identification engine 242, the packets are sent, by threat engine 244, to an appropriate decoder configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. Example policies can include C2 malware detection policies using the disclosed techniques for sample traffic based self-learning malware detection. An interface (I/F) communicator 250 is provided for management communications (e.g., via (REST) APIs, messages, or network protocol communications or other communication mechanisms).

Security Platform

Returning to FIG. 1, suppose a malicious individual (using system 120) has created malware 130, such as malware for a malicious web campaign (e.g., the malware can be delivered to endpoint devices of users via a compromised web site when the user visits/browses to the compromised web site or via a phishing attack, etc.). The malicious individual hopes that a client device, such as client device 104, will execute a copy of malware 130 to unpack the malware executable/payload, compromising the client device, and, e.g., causing the client device to become a bot in a botnet. The compromised client device can then be instructed to perform tasks (e.g., cryptocurrency mining, or participating in denial of service attacks) and to report information to an external entity, such as command and control (C2/C&C) server 150, as well as to receive instructions from C2 server 150, as applicable.

Suppose data appliance 102 has intercepted an email sent (e.g., by system 120) to a user, "Alice," who operates client device 104. In this example, Alice receives the email and clicks on the link to a phishing/compromised site that could result in an attempted download of malware 130 by Alice's client device 104. However, in this example, data appliance 102 can perform the disclosed techniques for sample traffic based self-learning malware detection and block access from Alice's client device 104 to the packed malware content and to thereby preempt and prevent any such download of malware 130 to Alice's client device 104. As will be further described below, data appliance 102 performs the disclosed techniques for sample traffic based self-learning malware detection, such as further described below, to detect and block such malware 130 from harming Alice's client device 104.

In various embodiments, data appliance 102 is configured to work in cooperation with security platform 122. As one example, security platform 122 can provide to data appliance 102 a set of signatures of known-malicious files (e.g., as part of a subscription). If a signature for malware 130 is included in the set (e.g., an MD5 hash of malware 130), data appliance 102 can prevent the transmission of malware 130 to client device 104 accordingly (e.g., by detecting that an MD5 hash of the email attachment sent to client device 104 matches the MD5 hash of malware 130). Security platform 122 can also provide to data appliance 102 a list of known malicious domains and/or IP addresses, allowing data appliance 102 to block traffic between enterprise network 140 and C2 server 150 (e.g., where C&C server 150 is known to be malicious). The list of malicious domains (and/or IP addresses) can also help data appliance 102 determine when one of its nodes has been compromised. For example, if client device 104 attempts to contact C2 server 150, such attempt is a strong indicator that client 104 has been compromised by malware (and remedial actions should be taken accordingly, such as quarantining client device 104 from communicating with other nodes within enterprise network 140).

As will be described in more detail below, security platform 122 can also receive a copy of malware 130 from data appliance 102 to perform cloud-based security analysis for performing sample traffic based self-learning malware detection, and the malware verdict can be sent back to data appliance 102 for enforcing the security policy to thereby safeguard Alice's client device 104 from execution of malware 130 (e.g., to block malware 130 from access on client device 104).

Further, security platform 122 can also provide other types of information to data appliance 102 (e.g., as part of a subscription) such as a set of information for performing the disclosed techniques for sample traffic based self-learning malware detection usable by data appliance 102 to perform inline analysis of such malware files as will be further described below.

A variety of actions can be taken by data appliance 102 if no signature for an attachment is found, in various embodiments. As a first example, data appliance 102 can fail-safe, by blocking transmission of any attachments not whitelisted as benign (e.g., not matching signatures of known good files). A drawback of this approach is that there may be many legitimate attachments unnecessarily blocked as potential malware when they are in fact benign. As a second example, data appliance 102 can fail-danger, by allowing transmission of any attachments not blacklisted as malicious (e.g., not matching signatures of known bad files). A drawback of this approach is that newly created malware (previously unseen by platform 122) will not be prevented from causing harm. As a third example, data appliance 102 can be configured to provide the file (e.g., malware 130) to security platform 122 for static/dynamic analysis, to determine whether it is malicious and/or to otherwise classify it.

Security platform 122 stores copies of received samples in storage 142 and analysis is commenced (or scheduled, as applicable). One example of storage 142 is an Apache Hadoop Cluster (HDFS). Results of analysis (and additional information pertaining to the applications) are stored in database 146. In the event an application is determined to be malicious, data appliances can be configured to automatically block the file download based on the analysis result. Further, a signature can be generated for the malware and distributed (e.g., to data appliances such as data appliances 102, 136, and 148) to automatically block future file transfer requests to download the file determined to be malicious.

In various embodiments, security platform 122 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 122 can be implemented across a scalable infrastructure comprising multiple such servers, solid state drives, and/or other applicable high-performance hardware. Security platform 122 can comprise several distributed components, including components provided by one or more third parties. For example, portions or all of security platform 122 can be implemented using the Amazon Elastic Compute Cloud (EC2) and/or Amazon Simple Storage Service (S3). Further, as with data appliance 102, whenever security platform 122 is referred to as performing a task, such as storing data or processing data, it is to be understood that a sub-component or multiple sub-components of security platform 122 (whether individually or in cooperation with third party components) may cooperate to perform that task. As one example, security platform 122 can optionally perform static/dynamic analysis in cooperation with one or more virtual machine (VM) servers, such as VM server 124.

An example of a virtual machine server is a physical machine comprising commercially available server-class hardware (e.g., a multi-core processor, 32+Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 122, but may also be provided by a third party. As one example, the virtual machine server can rely on EC2, with the remainder portions of security platform 122 provided by dedicated hardware owned by and under the control of the operator of security platform 122. VM server 124 is configured to provide one or more virtual machines 126-128 for emulating client devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (e.g., VM server 124). In other embodiments, analysis is performed at least in part by other components of security platform 122, such as a coordinator 144.

In various embodiments, security platform 122 makes available results of its analysis of samples via a list of signatures (and/or other identifiers) to data appliance 102 as part of a subscription. For example, security platform 122 can periodically send a content package that identifies malware files, including for network traffic based heuristic IPS malware detection, etc. (e.g., daily, hourly, or some other interval, and/or based on an event configured by one or more policies). An example content package includes new signatures generated using a malicious web campaign (MWC) signature generator 154 and/or other information (e.g., ML-based detection models), such as further described below. The subscription can cover the analysis of just those files intercepted by data appliance 102 and sent to security platform 122 by data appliance 102, and can also cover signatures of malware known to security platform 122. As will be described in more detail below, platform 122 can utilize malicious web campaign (MWC) signature generator 154 (e.g., the MWC signature generator that can be implemented as another system or sub-component of platform 122, such as will be further described below, such as with respect to FIGS. 4A-R), which can help data appliance 102 detect and perform inline blocking of potentially new/variant malicious web campaign related malware (e.g., using static and/or behavioral techniques, such as further described below).

In various embodiments, security platform 122 is configured to provide security services to a variety of entities in addition to (or, as applicable, instead of) an operator of data appliance 102. For example, other enterprises, having their own respective enterprise networks 114 and 116, and their own respective data appliances 136 and 148, can contract with the operator of security platform 122. Other types of entities can also make use of the services of security platform 122. For example, an Internet Service Provider (ISP) providing Internet service to client device 110 can contract with security platform 122 to analyze applications which client device 110 attempts to download. As another example, the owner of client device 110 can install software on client device 110 that communicates with security platform 122 (e.g., to receive content packages from security platform 122, use the received content packages to check attachments in accordance with techniques described herein, and transmit applications to security platform 122 for analysis).

Analyzing Samples Using Static/Dynamic Analysis

Figure 3:
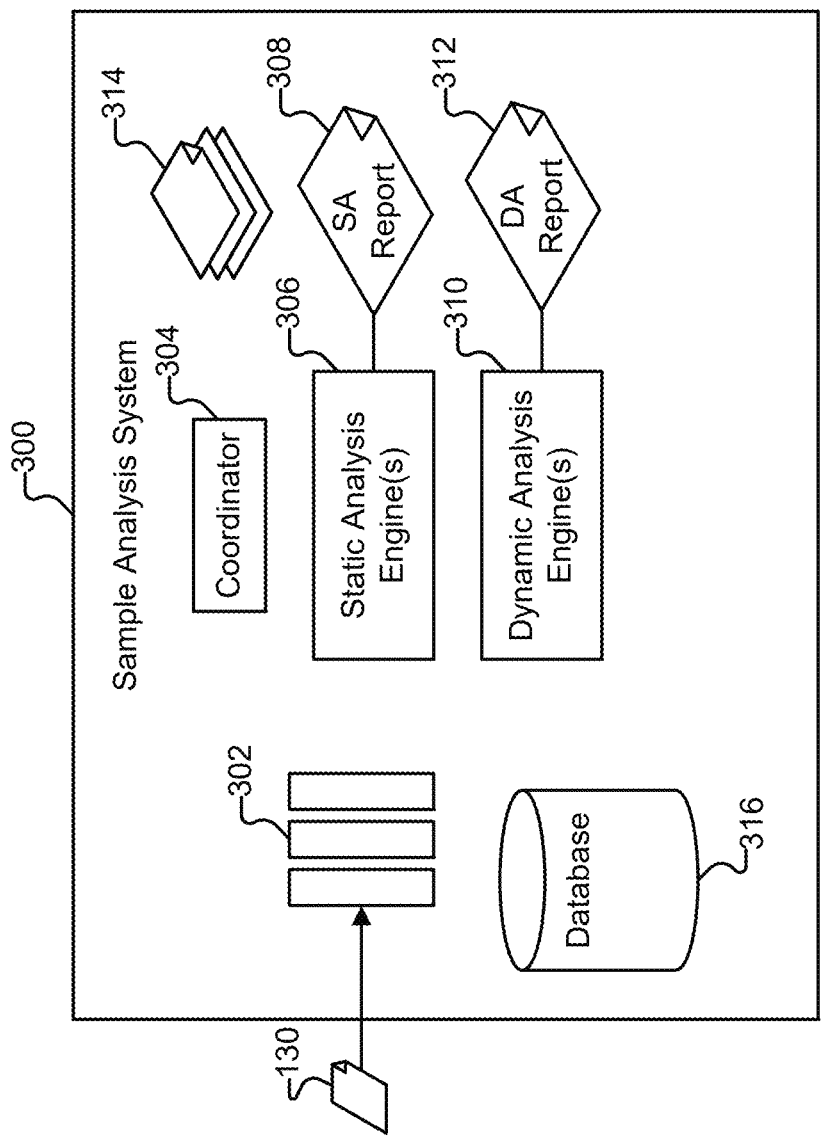
FIG. 3 illustrates an example of logical components that can be included in a system for analyzing samples.

FIG. 3 illustrates an example of logical components that can be included in a system for analyzing samples. Analysis system 300 can be implemented using a single device. For example, the functionality of analysis system 300 can be implemented in a malware analysis module 112 incorporated into data appliance 102. Analysis system 300 can also be implemented, collectively, across multiple distinct devices. For example, the functionality of analysis system 300 can be provided by security platform 122.

In various embodiments, analysis system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or security platform 122). Examples of information included in collection 314 are: URLs, domain names, and/or IP addresses of known malicious servers; URLs, domain names, and/or IP addresses of known safe servers; URLs, domain names, and/or IP addresses of known command and control (C2/C&C) domains; signatures, hashes, and/or other identifiers of known malicious applications; signatures, hashes, and/or other identifiers of known safe applications; signatures, hashes, and/or other identifiers of known malicious files (e.g., OS exploit files); signatures, hashes, and/or other identifiers of known safe libraries; and signatures, hashes, and/or other identifiers of known malicious libraries.

In various embodiments, when a new sample is received for analysis (e.g., an existing signature associated with the sample is not present in analysis system 300), it is added to queue 302. As shown in FIG. 3, application 130 is received by system 300 and added to queue 302.

Coordinator 304 monitors queue 302, and as resources (e.g., a static analysis worker) become available, coordinator 304 fetches a sample from queue 302 for processing (e.g., fetches a copy of malware 130). In particular, coordinator 304 first provides the sample to static analysis engine 306 for static analysis. In some embodiments, one or more static analysis engines are included within analysis system 300, where analysis system 300 is a single device. In other embodiments, static analysis is performed by a separate static analysis server that includes a plurality of workers (i.e., a plurality of instances of static analysis engine 306).

The static analysis engine obtains general information about the sample, and includes it (along with heuristic and other information, as applicable) in a static analysis report 308. The report can be created by the static analysis engine, or by coordinator 304 (or by another appropriate component) which can be configured to receive the information from static analysis engine 306. As an example, static analysis of malware can include performing a signature-based analysis. In some embodiments, the collected information is stored in a database record for the sample (e.g., in database 316), instead of or in addition to a separate static analysis report 308 being created (i.e., portions of the database record form the report 308). In some embodiments, the static analysis engine also forms a verdict with respect to the application (e.g., "safe," "suspicious," or "malicious"). As one example, the verdict can be "malicious" if even one "malicious" static feature is present in the application (e.g., the application includes a hard link to a known malicious domain). As another example, points can be assigned to each of the features (e.g., based on severity if found; based on how reliable the feature is for predicting malice; etc.) and a verdict can be assigned by static analysis engine 306 (or coordinator 304, if applicable) based on the number of points associated with the static analysis results.

Once static analysis is completed, coordinator 304 locates an available dynamic analysis engine 310 to perform dynamic analysis on the application. As with static analysis engine 306, analysis system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a virtual machine instance (e.g., emulation/sandbox analysis of samples for malware detection, such as the above-described C2 malware detection based on monitored network traffic activity). In some embodiments, results of static analysis (e.g., performed by static analysis engine 306), whether in report form (308) and/or as stored in database 316, or otherwise stored, are provided as input to dynamic analysis engine 310. For example, the static report information can be used to help select/customize the virtual machine instance used by dynamic analysis engine 310 (e.g., Microsoft Windows 7 SP 2 vs. Microsoft Windows 10 Enterprise, or iOS 11.0 vs.

iOS 12.0). Where multiple virtual machine instances are executed at the same time, a single dynamic analysis engine can manage all of the instances, or multiple dynamic analysis engines can be used (e.g., with each managing its own virtual machine instance), as applicable. As will be explained in more detail below, during the dynamic portion of the analysis, actions taken by the application (including network activity) are analyzed.

In various embodiments, static analysis of a sample is omitted or is performed by a separate entity, as applicable. As one example, traditional static and/or dynamic analysis may be performed on files by a first entity. Once it is determined (e.g., by the first entity) that a given file is malicious, the file can be provided to a second entity (e.g., the operator of security platform 122) specifically for additional analysis with respect to the malware's use of network activity (e.g., by a dynamic analysis engine 310).

The environment used by analysis system 300 is instrumented/hooked such that behaviors observed while the application is executing are logged as they occur (e.g., using a customized kernel that supports hooking and logcat). Network traffic associated with the emulator is also captured (e.g., using pcap). The log/network data can be stored as a temporary file on analysis system 300, and can also be stored more permanently (e.g., using HDFS or another appropriate storage technology or combinations of technology, such as MongoDB). The dynamic analysis engine (or another appropriate component) can compare the connections made by the sample to lists of domains, IP addresses, etc. (314) and determine whether the sample has communicated (or attempted to communicate) with malicious entities.

As with the static analysis engine, the dynamic analysis engine stores the results of its analysis in database 316 in the record associated with the application being tested (and/or includes the results in report 312 as applicable). In some embodiments, the dynamic analysis engine also forms a verdict with respect to the application (e.g., "safe," "suspicious," or "malicious"). As one example, the verdict can be "malicious" if even one "malicious" action is taken by the application (e.g., an attempt to contact a known malicious domain is made, or an attempt to exfiltrate sensitive information is observed). As another example, points can be assigned to actions taken (e.g., based on severity if found; based on how reliable the action is for predicting malice; etc.) and a verdict can be assigned by dynamic analysis engine 310 (or coordinator 304, if applicable) based on the number of points associated with the dynamic analysis results. In some embodiments, a final verdict associated with the sample is made based on a combination of report 308 and report 312 (e.g., by coordinator 304).

1 Introduction to Automated Generation of Behavioral Signatures for Malicious Web Campaigns As the internet grows exponentially, more users than ever rely on it to perform various personal and professional activities such as communicating over social media, carrying out financial tasks, consuming entertainment, and fulfilling professional responsibilities. Unfortunately, malicious actors have evolved to target innocent victims on the web in a wide range of malicious activities, including promoting scams [17,22,34], coaxing users to click on malicious ads [29,39], eliciting their credentials by faking a legitimate web site [25], or stealthily stealing their clicks [2]. Often these attacks are carried out at scale on multiple domains to increase their effectiveness, resulting in a web-based malicious campaign.

Defenses against such campaigns often come in the form of blocklist services such as Google Safe Browsing [31]. Blocklists mark a URL and/or domain for malicious activity, causing the adversary to simply move the campaign content to a new unmarked URL/domain. This creates a cat and mouse game between blocklists and the malicious campaigner. Researchers have explored detecting various types of malicious campaigns on the web [17, 22,25,34-36,39]. The approaches used in prior work involve various supervised and unsupervised learning or observation based on features extracted from highly correlated data associated with the targeted campaign. The resulting detection systems are often limited by their shortcoming of application on non-targeted campaigns, or opaque machine learning models that are hard to tune and diagnose. However, to the best of our knowledge none of the previous web-based malicious campaign detection systems try to automate the detection of campaigns in general and produce a detection signature that is easy to comprehend (e.g., in contrast to ML-based models), extend, and apply on previously unseen data for further detection.

In some embodiments, an automated web-based malicious campaign detection system is disclosed that identifies campaigns through repeating behavioral patterns observable on URLs belonging to the campaign. Our detection system generates campaign signatures consisting of both static and dynamic behavior patterns as a footprint of web-based campaigns. The signature generation algorithm (e.g., as further described below in the Signature Generation section at § 5) can recognize behavior patterns for campaigns from simple labeled data. The campaign signatures generated are transparent as they consist of behavior patterns represented in plain text, thus making it easy to diagnose and extend if needed. The signatures are robust against evasive maneuvers such as encryption and obfuscation, because they include dynamic behavior patterns along with static ones. Because of their simple construction and structure, the generated signatures are easy to apply in the wild for further detection of campaign URLs.

As such, the disclosed detection system embodiments are based on the simple observation that URLs belonging to the same campaign share static or dynamic behavior(s), affecting the targeted victim's browsing experience. These shared behaviors constitute the footprint of the campaign and we want to synthesize signatures representing this footprint in our detection system. In an example implementation, we extended VisibleV8 [14], an open-source tool for deep instrumentation of the Chromium browser (§ 3), and use this instrumented browser to crawl labeled URLs to extract both static and dynamic properties (§ 4). Subsequently, we determine the repeating behavior patterns in our collected data with the most discriminating characteristics between the benign and malicious labels, and generate our campaign signature from these discriminating behavior patterns (§ 5). To evaluate our process, we split our collected data in chronological order, generate signatures from designated labeled data and apply them on the remaining labeled data (§ 6.1). We further prove that our signatures can be used to detect URLs belonging to campaigns in the wild by applying the signatures on data collected from unlabeled URLs (§ 6.2).

As will be further described below, we crawled 2.8 million labeled URLs without any categorization and generated 379 campaign signatures using our proposed approach. We were able to identify 36,427 unique malicious URLs from our labeled data. We further applied our signatures on 431 thousand unlabeled URLs and detected 471 unlabeled URLs belonging to 34 campaigns, which we confirmed to be malicious through VirusTotal and manual inspection. For example, the following embodiments will be further described below:

We disclose an automated system for large-scale detection of web-based malicious campaigns through signatures of repeating behavioral patterns. Our system aims to be generic and not focus on any particular type of campaign. We only require labeled data without any categorization. The campaign signatures are transparent, can work in the presence of encryption and/or obfuscation, are easy to apply, and are effective in the wild.

We perform deep instrumentation of the Chromium browser for tracking dynamic behaviors with significant detail. We use this custom browser to crawl our labeled URLs, and generate campaign signatures from the collected data.

We demonstrate that our generated signatures can successfully identify malicious URLs belonging to campaigns by evaluating them on both labeled and unlabeled URLs.

2 Background

In this section, we explain and define certain terminologies in the context of this description along with an introduction to the building blocks of our signature generation process.

2.1 Repeating Behaviors

The disclosed techniques for automated signature generation of behavioral signatures for malicious web campaigns build upon the observation that most malicious campaigns on the web share either static or dynamic behavior [25, 35, 36, 39]. In fact, recent malicious campaign detection systems rely on repeated behavior to cluster the campaign URLs and find malicious campaigns on the web [36,39] using unsupervised learning. However, the resultant detection model is opaque to human readers and is infeasible when it comes to applying them for further detection in the wild. Because ML-models often require significant amounts of manual tuning, and given that on the web, URLs tend to skew towards benign, ML-models are often subject to stringent low false positive requirements which a lot of them fail to achieve.

As described herein, we focus on generating human-interpretable malicious campaign signatures that can be easily applied to prior unknown data for extended detection from non-clustered and non-categorized labeled data. To achieve this, we first have to determine discriminating repeating behaviors as campaign footprint patterns and synthesize the campaign signature from them. In the following sections, we introduce what we consider as behavior and their corresponding representation on the web and how behavior can string together a transparently human-interpretable signature that can be easily tuned and further applied for detecting unknown data.

2.2 Behavior Patterns & Predicates

Web pages possess behaviors that are either visible to the end-user visiting the page or affect the end user's experience or environment during the visit. Such behaviors are either achieved through static content that is visible to the user or dynamic JavaScript content that affects the user's experience. As described herein, we use the term behavioral patterns on a web page as both static and dynamic properties of the web page that can be generalized and identified over other web pages. We use the term predicates as the textual representatives for these behavioral patterns we want to identify on a web page. Although logical predicates have specific definitions in the mathematical domain, as further described below, predicates are dictionaries or sets of key-value pairs of length two. The first key-value pair contains the type of predicate representing the behavior. The second key-value pair is the properties representing the predicate which is a variable-length tuple consisting of text (and) or number, e.g., {type: "html_url", properties: ("http://example.org")} or {type: "api_call", properties: (Window.setTimeout, "handler ( )", 500)}. We give more comprehensive details of the predicates used herein as further described below in § 4.

2.3 Signatures

Figure 4A:
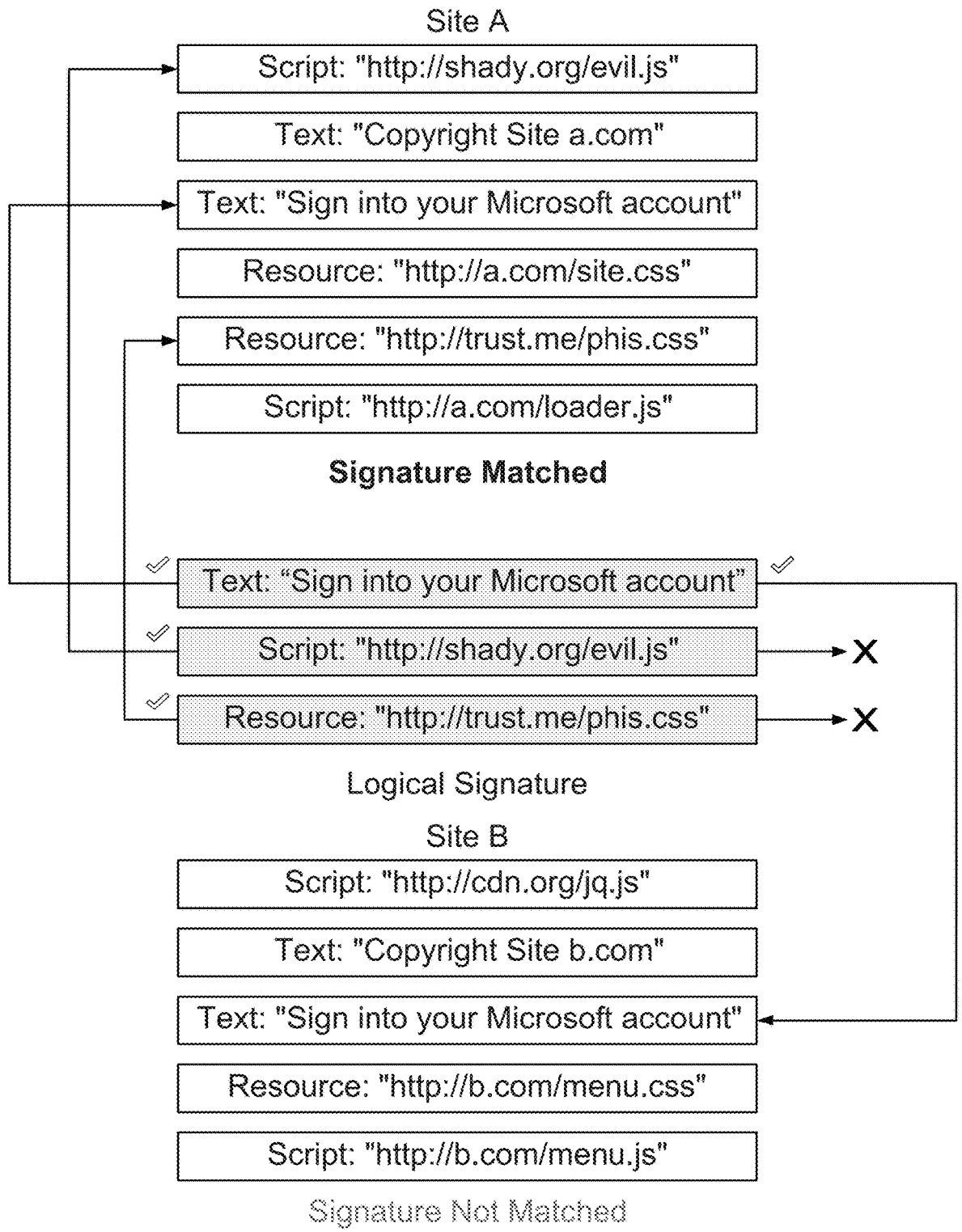
FIG. 4A illustrates a logical signature and matching process in accordance with some embodiments.

FIG. 4A illustrates a logical signature and matching process in accordance with some embodiments. As described herein, we use the term signature as an unordered conjunction of behavior predicates. This unordered conjunction of behavior predicates constitutes the footprint of a campaign we want to identify. To apply a synthesized signature for a match on a candidate web page, we extract our desired behavior predicates from the web page and attempt to identify the presence of all the behavior predicates in the signature in the set of extracted predicates from the web page. We recognize a successful match when all the predicates in the signature are found on the web page; otherwise, we declare it as a non-match, as depicted in FIG. 4A.

2.4 Synthesizing Signatures Through Induction

To generate campaign signatures from given labeled data, we first need to identify the repeating behavioral patterns that are most discriminating between malicious (e.g., positive) data and benign (e.g., negative) data. It is quite possible that there are only a handful of URLs belonging to a malicious campaign in our data, where the malicious behavior does not repeat in our dataset, and would not be included in our discriminating set. However, in the scope of given data such behavior is just random, and as more URLs belonging to the campaign become available in the dataset, the more likely we would extract discriminating predicates from them.

Once we identify our discriminating behavior predicates, we want to see on which URLs we observed these predicates. We want to synthesize a signature as the least conjunction of behavior predicates that represents the footprint of the malicious campaign in our data. To achieve this, we take our inspiration from the domain of learning logic programs through induction [11, 24]. The underlying settings for such learning directives can be broadly described in the following terms. Given a set of background knowledge B, along with a set of positive examples E+ and a set of negative examples E− each, we want to find a hypothesis consisting of logical clauses H such that the hypothesis in conjunction with the background knowledge explains the positive ground truths $B \wedge A \vdash E^+$, and does not do so for the negative ground truth set, $B \wedge H \not\vdash E^-$.

In classic logical machine learning, numerous algorithms have been proposed for this type of learning based on searching in the hypothesis space. Top-down algorithms search begins from the most general and searches towards the most specific logical clauses in the hypothesis clause space relying on search strategies like a greedy search approach (FOIL by Quinlan et al. [28]) or a breadth-first search (MIS by Shapiro et al. [33]). Bottom-up algorithms [23, 32], however, leverage the inverting resolution where hypothesis clauses are concocted through incremental generalization of ground truth examples in combination with the provided background knowledge. Since both of these approaches suffer on searching strategies, they also suffer from the issues that stunt a searching strategy, where an effective search occurs at the cost of efficiency, and vice-versa. Both categories of algorithms also require the presence of background knowledge, without which inductive learning through these algorithms is not possible.

Relative least general generalization (rlgg) is an idea devised by Plotkin et al. [26, 27] that discards searching over the hypothesis clause space in favor of constructing most specific clauses covering the given ground truth examples. Plotkin's rlgg approach works even in the absence of background knowledge by providing a partial ordering of clauses through substitution, named θ-subsumption. The clauses are ordered through the introduced subsume relation over the hypothesis space, followed by formulating the least general generalization (lgg) of two clauses as the greatest lower bound in the hypothesis clause space, again through the subsume relation. We refer more interested readers towards Plotkin's papers [26, 27] for further details on formulating the hypothesis.

In our approach, we deviate from Plotkin's notion of rlgg slightly by introducing our own simplified variation of partial ordering of clauses (e.g., behavior predicates) to generate the hypothesis (e.g., signature) that does not use substitution. However, similar to rlgg, we also forego the use of background knowledge and simply use ground truth examples to derive our hypothesis. We present our algorithm for synthesizing the signatures in full detail in § 5.

3 Signature Structure

3.1 Limitations of Static Patterns

On a web page, static patterns are behavioral patterns that we observe or deduce from the static content of the web page. Static patterns are usually brittle and can become obsolete quickly, as the adversary is only required to minutely modify the static content of the page to evade signatures generated from static content. Furthermore, adversaries can use techniques like obfuscation or encryption to generate the static content on the web page or hinder the static pattern extraction, resulting in static patterns that could be stunted and thus ineffective. To circumvent this problem, we complement static patterns with dynamic behavioral patterns as further described below. Even if an adversary can take evasive measures to stem static pattern extraction or identification, behavioral patterns generated from the dynamic execution of scripts on the web page make the signatures robust enough to identify the malicious activity.

3.2 Tool for Dynamic Patterns

Generating signatures from dynamic execution traces have been explored in the domain of binary malware detection with a certain degree of success [4, 7, 11, 18]. The most reliable dynamic behavior contributing to the synthesized signatures in detecting binary malware has been system call traces. We took inspiration from prior research [11] and focused on browser API calls from script execution traces for our source of dynamic behavioral patterns. Similar to system calls, browser API calls interact with the underlying system, in our case—the browser itself, to read or modify the state of it. Thus, like system calls, browser API calls can also contribute to the signature generation through dynamic behavioral patterns representing the intent of JavaScript-based (JS-based) malware.

To get all browser API calls from dynamic execution, we leverage VisibleV8 [14]. VisibleV8 is an open-source tool that attempts to mimic the behavior of the strace utility by logging all standardized browser API calls within the Chromium browser (e.g., Chromium is the open-source variant of Google's Chrome browser containing all functionalities sans Google's branding and some proprietary service integration). VisibleV8 achieves this through instrumentation of the V8 JavaScript (JS) engine to trace where browser API calls cross the boundary between C++ code-base and JavaScript runtime. We refer to the original paper for further details.

3.3 Extending VisibleV8

VisibleV8 produces trace log files, containing all invoked API calls along with JavaScript object property access or modification. As described herein, we focused exclusively on browser API calls. However, VisibleV8 in its current state only gives the name of the browser API call being invoked and the script source code location where it was invoked from. The fact that a browser API call was invoked does not provide us with enough information to meaningfully create behavioral patterns and subsequently robust signatures.

To enhance the information gained from a browser API call, we wanted to include the parameter names and the corresponding passed-in argument values to the browser API call in our behavioral patterns' logical predicate as key-value pairs. The primitive argument types such as strings and numbers are straightforward to support for this purpose. However, more complex parameter types—namely objects and array parameters, posed a challenge and required further strategy. Ideally, we would want to have object members and their respective values as key-value pairs delimited in a specific manner. But, as object arguments can have deeply nested objects and even circular references within them, a simple serialization of object arguments does not easily work for our purpose.

We decided to adopt a simpler approach to serializing object arguments similar to the browser built-in function JSON.stringify, where the prototype chain of the object is ignored. Additionally, for nested objects, we simply serialize by assigning the value of the parent object member to the type of the nested object through the constructor name. We treat JavaScript array arguments as objects where the keys are the indexes of the array itself and adopt the same strategy for serializing individual array member values. We extended the existing code-base of VisibleV8 by further instrumenting the V8 runtime library for our requirements. We applied and built Chromium version 91.0.4472.101 with our instrumented V8.

Figure 4B:
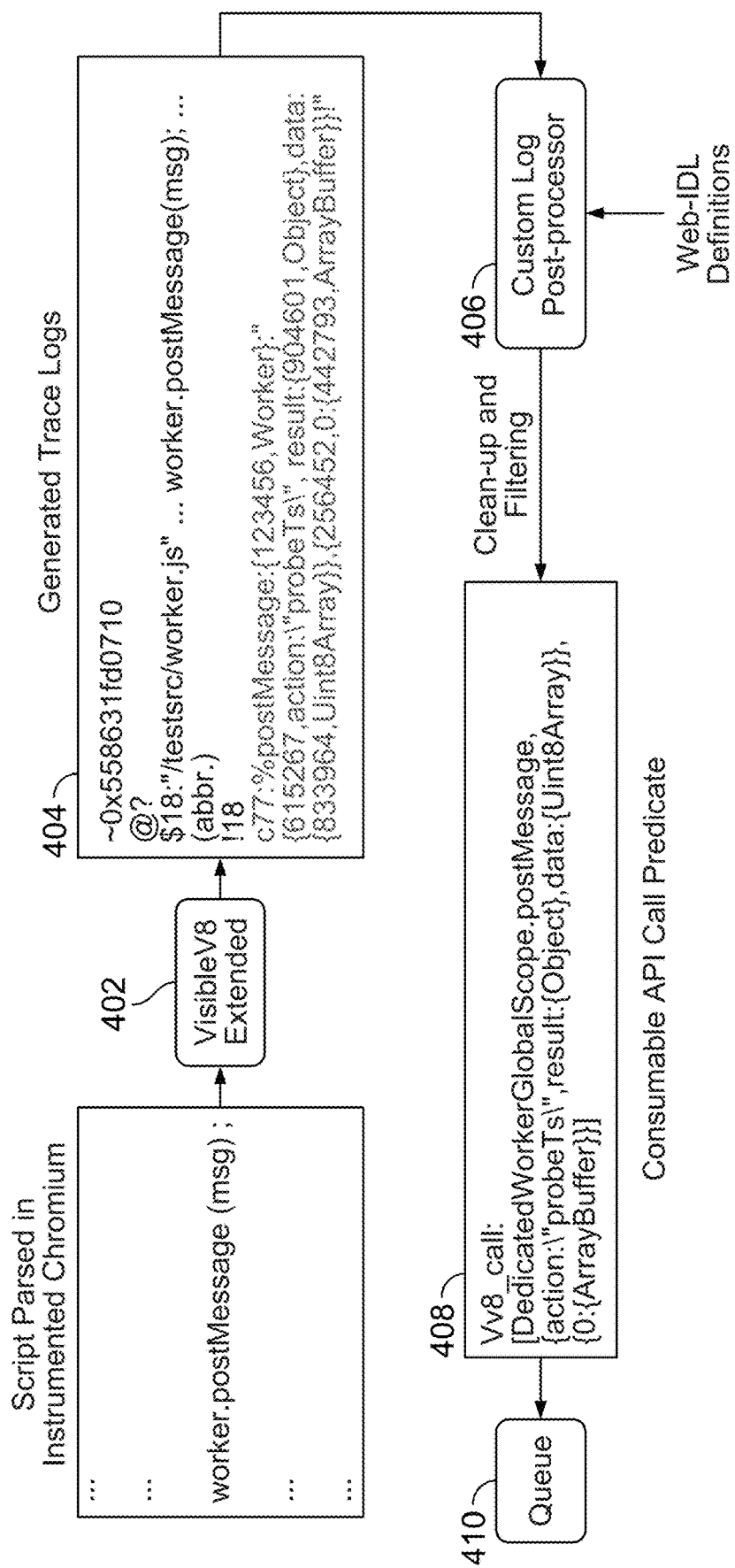
FIG. 4B illustrates an example dynamic logical predicate from extended VisibleV8 in accordance with some embodiments.

FIG. 4B illustrates an example dynamic logical predicate from extended VisibleV8 in accordance with some embodiments. The entire API call predicate extraction process is depicted in FIG. 4B. The trace log files (404) generated through the VisibleV8 (402) are processed through a post-processor (406). Given that our instrumentation added further content on the generated logs, we added our custom post-processing pass to handle the newly added extra information and subsequently emit ready-to-consume logical predicates for our dynamic behavioral patterns for browser API calls. As shown at 408, during our post-processing pass, we extract the API calls from the trace logs and strip them of superfluous information, such as V8-generated internal object identifier hashes. The API calls are then further standardized to their corresponding browser API call form as specified in the interface definition language 2 (Web IDL) formats through Blink, Chromium's DOM-rendering engine.

As an API call can be made inside a loop in the source code, resulting in the same execution trace multiple times in the log, we wanted to filter out the extracted predicates from these redundant calls, so that the signature synthesizing process does not get skewed due to their presence. For this, we extracted only unique API call and argument tuples from a single web page, without recording the same API call invocation with the same argument more than once. The resulting predicates are then submitted to a queue (410) for a client to process them, like the predicate saver.

4 Data Collection

Figure 4C:
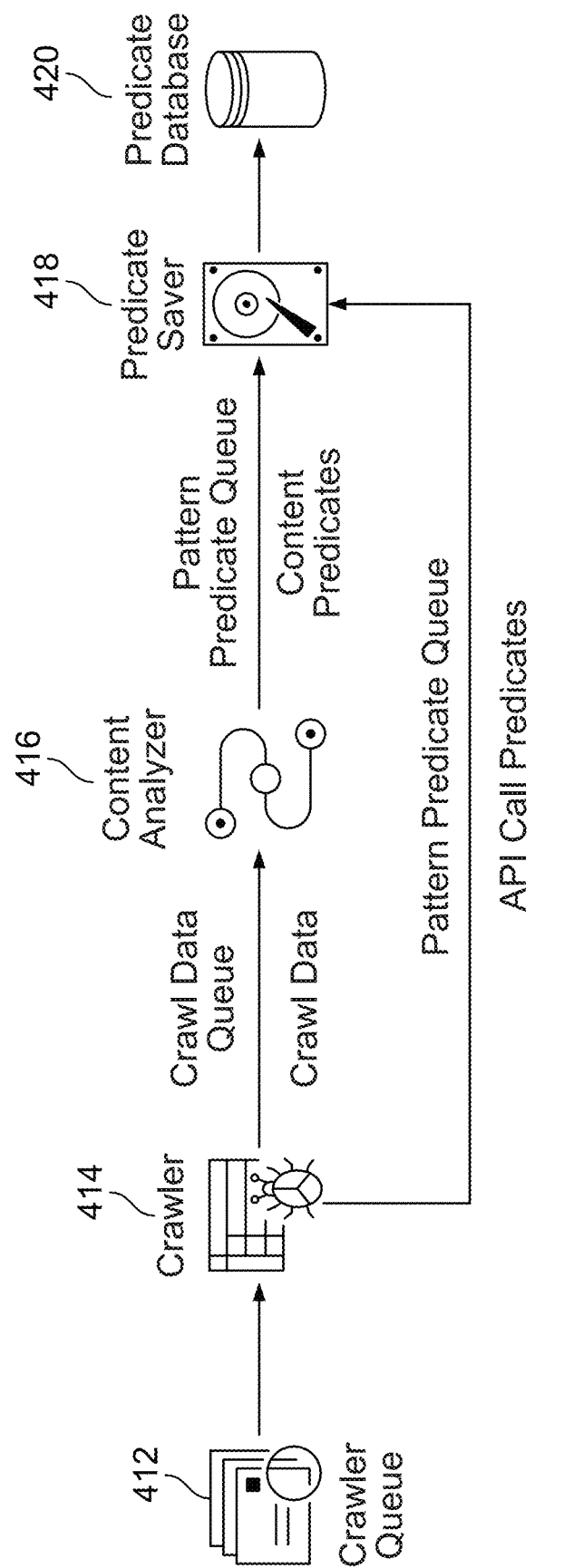
FIG. 4C illustrates a predicate extraction pipeline from crawled web pages in accordance with some embodiments.

FIG. 4C illustrates a predicate extraction pipeline from crawled web pages in accordance with some embodiments. To synthesize signatures, we need to extract the content and behavioral predicates from both malicious and benign web sites. We depict this data-collection pipeline in FIG. 4C and discuss the prominent components in the following sections.

4.1 Crawler

Referring to FIG. 4C, we designed a crawler (414) based on the open-source Chromium browser instrumented with our enhanced VisibleV8 variant, as described in § 3. We built the crawler on the NodeJS library Puppeteer [12]. Puppeteer instruments the Chromium browser using the Chrome DevTools protocol [13].

The crawler pulls a crawling job from a queue (412) containing a URL to visit. The crawler pulls a single job from the queue and proceeds to visit the web page of the URL within the job. For each URL, the crawler launches an instance of our custom build of Chromium in headless mode using puppeteer, opens a tab, and navigates to the URL. We set a fixed amount of time (e.g., 15 seconds) for navigating to the URL. After a successful navigation, we stay on the web page for another fixed amount of time (15 seconds) in order to allow the web page to load any resources as needed. Both the navigation and the subsequent loitering on the page were limited to a total of 30 seconds from the start of the navigation. After this timeout of 30 seconds, we tear down the page, the tab, and the browser instance.

We collect a number of static content and auxiliary information during each visit. This includes all network requests made, the responses received along with the headers and bodies of all HTTP resources downloaded, all alert dialog types and their corresponding text (e.g., before being silently squashed for resuming the page visit). Before tearing down the page, we also collect the final rendered DOM document. All of this static content is subsequently forwarded to a content analyzer (416) described in § 4.2.

During the visit, our extended VisibleV8 post processor extracts ready to use dynamic predicates containing browser API calls from the trace logs as detailed in § 3. The post processor then delegates these predicates through a queue to a predicate saver for storing into the predicate database.

4.2 Content Analyzer

Referring to FIG. 4C, the content analyzer (416) listens to a queue and awaits messages containing static content collected during a crawler visit. When a message containing static content is received, the content analyzer attempts to extract static content predicates from each collected piece of information if present.

The content analyzer can extract multiple types of static predicates from the collected request-response, alerts, and DOM document during the crawling process. The predicates extracted can be divided into three categories: traffic, alert, and HTML predicates. We briefly discuss each category and the predicate types used for the disclosed system below.

Traffic Predicates. During our crawl, we record the request and the corresponding response received along with other meta information for each successfully finished request. Inside our static analyzer, we iterate over these collected request-response pairs, and extract four distinct types of traffic predicates. We extract the URL (1) and the derived domain name (2) from the URL of the request, and the IP address (3) of the server that serves the response as predicates. Finally, we take the SHA256 hash of the response body as a content hash predicate (4).

Alert Predicates. If we encounter a dialog on the web page while crawling, we record the dialog type and the dialog text before dismissing it, since modal-type dialogs can be blocking for our crawl. We extract the alert predicates as the combination of the dialog type and the corresponding text during content analysis.

HTML Predicates. Right before we finish the crawl and tear down the web page, we record a snapshot of the final DOM document. The DOM document and the responses received contribute to the HTML predicates extracted in the content analyzer. We iterate over the responses received that have a status code of 2XX and a resource type of HTML, style, and script, along with the final DOM document to extract four predicate types. We extract the language and script attribute values for each script tag as attribute predicates. For all textual HTML tags, we extract the contained text truncated to a preset bound as text predicates. For a predetermined set of HTML tags and their certain attribute values (e.g., see FIG. 4R, which illustrates a Table 10 that includes HTML tags and corresponding attributes for extraction of HTML URL and Domain predicates in accordance with some embodiments), we extract the URL and the domain derived from it as URL and domain predicates, respectively.

FIG. 4D illustrates Table 1 that includes extracted static and dynamic predicates during data collection in accordance with some embodiments. Table 1 details all possible predicates, both static and dynamic, collected through our pipeline. With the sole exception of the dynamic API call predicates from VisibleV8 (see § 3), the rest are extracted by the content analyzer. After extracting static predicates, the content analyzer stores the extracted predicates by forwarding the predicates to a predicate saver (418) that can be stored in a predicate database (420) as also shown in FIG. 4C.

4.3 Deployment

We deployed multiple instances of the crawler using Docker Compose across a number of virtual machines. Both the content analyzer and the predicate saver were also deployed as single instances running on virtual machines. We used Redis for the crawler queue and Google Cloud Pub Sub for the queues used by the crawler, the content analyzer, and the predicate saver. For storing the large blob objects during crawl and storing the predicates, we used Google Cloud BigTable and BigQuery, respectively. We delineate an overview of our collected data in the following section 4.4.

4.4 Collected Data

We partnered with a large cybersecurity company that provides services for URL filtering, network and cloud security solutions to numerous enterprise customers. Using our deployed data collection pipeline, we crawled, extracted, and collected predicates from a variety of labeled and unlabeled URL sources. For benign URLs, we crawled URLs from a sample of both Tranco [38] and Alexa [1] top 1 million sites along with web sites that are labeled to be benign in common customer traffic by our partnering company according to popularity and cross-referenced with their threat intelligence. We crawled a portion of the VirusTotal [40] URL feed that has high-confidence detection (e.g., detection score>=3) for our malicious data source. Furthermore, for unlabeled data, we crawled a mixture of customer traffic URLs including URLs inside emails, URLs embedded in files, such as PDFs, executable files, or MS Word documents, and uncategorized URLs according to a popular URL filtering product from our partnering company.

FIG. 4E illustrates Table 2 that includes crawled URLs and collected predicates by verdict and Table 3 that includes collected predicates by type in accordance with some embodiments. We ended up with approximately 1.5 billion predicates from about 3.3 million URLs. However, approximately one-third of our malicious labeled URLs (381,000) did not have any content, and, thus, we were not able to extract any predicates from these. Table 2 shows the breakdown of the crawled URLs and the collected predicates from them. Out of the approximately 1.5 billion predicates, dynamic behavioral predicates constitute 58.50%, the rest are static. The breakdown of collected predicates by type is shown in Table 3.

5 Signature Generation

To detect the campaigns, our signature generation process consists of three distinct sequential steps: (1) identifying the repeating predicates with the most discriminative properties, (2) synthesizing the signatures from the identified predicates and the URLs they are observed on, and (3) filtering out the less optimal signatures. We describe each of these three steps in the following sections and present our signature synthesis algorithm.

5.1 Ordering of Predicates

All the predicates from our data collection pipeline are observed in two overlapping sets—the predicates that are extracted from a URL with a verdict of malicious, and predicates obtained from the URLs with a verdict of benign. We refer to these sets as positive and negative sets respectively for brevity in the rest of this section.

FIG. 4F illustrates an algorithm for ordering predicates to construct a set of repeating discriminative predicates in accordance with some embodiments. For this particular step of the signature generation process, as discussed in § 2, we want to order our collected predicates to determine the most prominent repeating predicates that are present in our positive set, but are not included in the negative set. To achieve this without the substitution-based subsumption relation in the rlgg approach, we leverage a simple frequency count for each predicate for membership of either set. For each encounter of a predicate in the positive set, we increase the positive count by one, whereas we increment the negative count by one every time the predicate is found in the negative set. We filter out all such predicates with a negative count of more than zero, and further discard predicates that do not have a certain positive count to ensure weeding out of weak predicates for our cause (e.g., in our case, this number was 10). This is followed by ordering the remaining predicates by their positive count in descending order. We take the top 'n' (e.g., we present the parameter tuning process for our algorithm in § 5.4) predicates and construct the set of repeating predicates that have the most discriminative capabilities. In essence, this gives us the predicates that are most frequent on the malicious URLs, but are not observed on the benign URLs. Algorithm 1 depicts this process in its entirety as shown in FIG. 4F.

5.2 Generating Signatures

Once we construct the set of discriminative predicates, the process of synthesizing signatures from our labeled data is straightforward. For each predicate present in the set, we retrieve all URLs on which this predicate was encountered. Given that the predicates in the discriminative set were only observed in the positive set, this step provides us with all the malicious URLs this predicate was extracted from.

Subsequently, we retrieve the predicate sets for each of these URLs that intersect with the set of repeating discriminative predicate set. We then generate a single signature from the intersection of these predicate sets. The synthesized signature is essentially the minimal set of predicates that can identify the set of malicious URLs obtained in the prior step.

5.3 Filtering Signatures

FIG. 4G illustrates an algorithm for generating signatures from the set of discriminative repeating predicates in accordance with some embodiments. When we generate a signature, we are faced with the decision of whether to discard it or include it in the set of signatures. We do want to filter out generated signatures for two particular reasons. First, we want to have each of our synthesized signatures have a certain degree of coverage, if we end up having signatures that can only identify a minute number of web pages, then the signature is not very useful when it comes to identifying campaigns, and we would eventually end up with an inordinate number of signatures to apply—reducing feasibility greatly. For this reason, we filter out any generated signatures that do not cover a minimum number of malicious URLs (the set of URLs from whose predicates the signature was generated).

Second, we want our generated signatures to have an acceptable level of accuracy and precision for identifying campaigns. From a basic observation, a signature with a smaller number of predicates is likely to be more liberal and would match more web pages, whereas a signature with a larger number of predicates would be hard to match and thus be conservative. Since a liberal signature would likely result in a higher rate of false-positives in the detected campaigns, we also discard signatures with a number of predicates below a certain threshold. We discuss these two filtering parameter optimizations in § 5.4. The signature generation from the discriminate set of predicates and the subsequent filtering is displayed in Algorithm 2 as shown in FIG. 4G.

5.4 Parameter Optimization

From our signature synthesizing algorithm, we have four parameter values we determine before applying the algorithm on real-world data: the parameters for determining the predicate order—the top discriminative repeating predicate count threshold $C_{top}$, and the minimum positive count threshold $F_{min}$; the parameters for filtering generated signatures—the minimum URL count threshold $U_{min}$, and the minimum predicate count threshold $P_{min}$. We describe our parameter selection process for each of these in this section.

Predicate count threshold $C_{top}$. To find the optimal value for this parameter, we derived the distribution of our predicates' frequency in our collected data that is observed only on the positive (malicious) URLs, but never in the negative (benign) URLs. We found that our data had approximately 56 million predicates that only showed up in the positive URLs, and their positive frequency distribution is heavily skewed towards the last percentile. This implies that only 1% of these predicates show any form of repeating characteristics, and the rest of them are just randomly unique. Based on this observation, we selected the value of this parameter to be 50,000, which is a little smaller than ~1% of 56 million.

Minimum positive count threshold $F_{min}$. As mentioned in the prior paragraph, our discriminative repeating predicates were heavily skewed towards the single top percentile, with the highest positive frequency being 22,850 and the lowest being 4. For this parameter, we picked the value of 10 to ensure that all the predicates selected by the $C_{top}$ value in the previous step are considered.

Minimum URL count threshold $U_{min}$. Unlike $C_{top}$, we adopted a different strategy to find the optimal value for this parameter inspired by hyperparameter optimization [10]. We split our collected predicates into three distinct slices in the chronological order they were collected. We applied our algorithm with various values of this parameter while keeping all other parameters the same on the collected predicates until the 80th percentile to generate signatures. We then apply the generated signatures on the next ten percentiles. The reason for this process is to avoid introducing bias in our signatures by generating signatures from data collected in the future to apply to past data. We keep the data from the last ten percentiles for our final evaluation as described in § 6. FIG. 4K illustrates Table 5 that includes a breakdown of labeled predicates used for each process by percentile slices (* in unlabeled evaluation, we applied the signatures generated from labeled data to unlabeled data) in accordance with some embodiments. Specifically, Table 5 shows the labeled data slices used for each purpose as described herein.

Figure 4H:
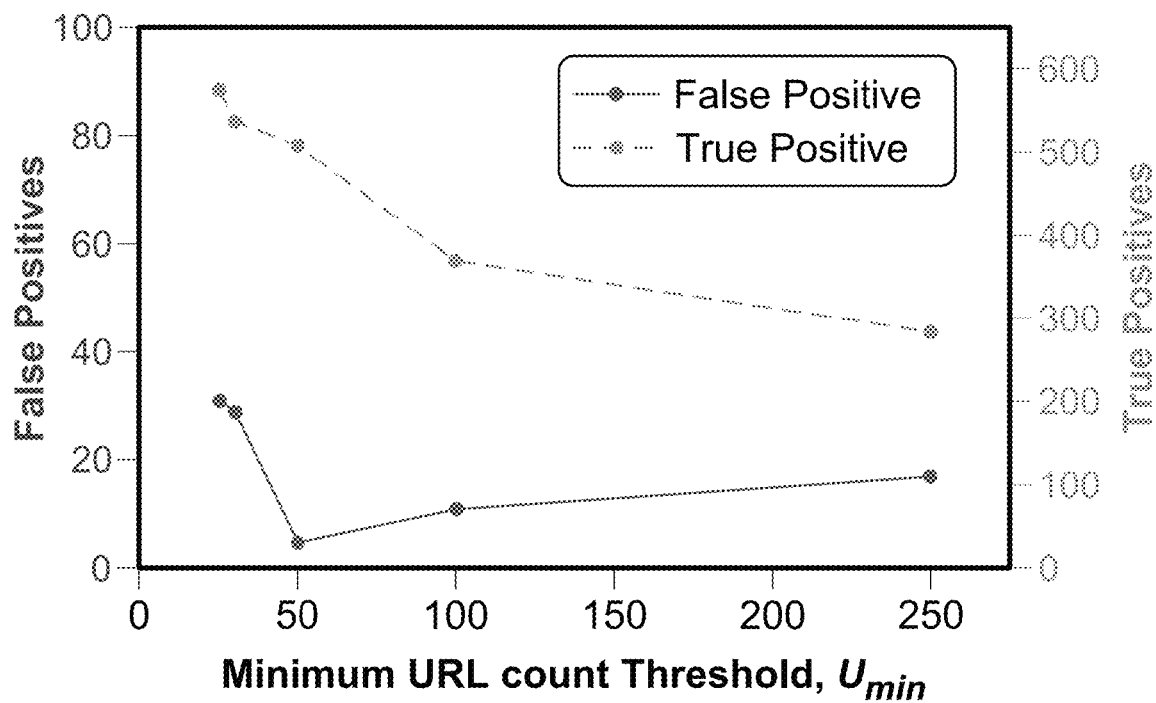
FIG. 4H is a graph of the minimum URL count Threshold, $U_{min}$, in accordance with some embodiments.

To determine the performance of our parameter, we used the metric of keeping the FP numbers as low as possible, while elevating the TP numbers. FIG. 4H is a graph of the minimum URL count Threshold, $U_{min}$, in accordance with some embodiments. Specifically, FIG. 4H displays how the various values of $U_{min}$ affected the metric numbers, and based on this observation, we picked the value of this parameter to be 50.

Figure 4I:
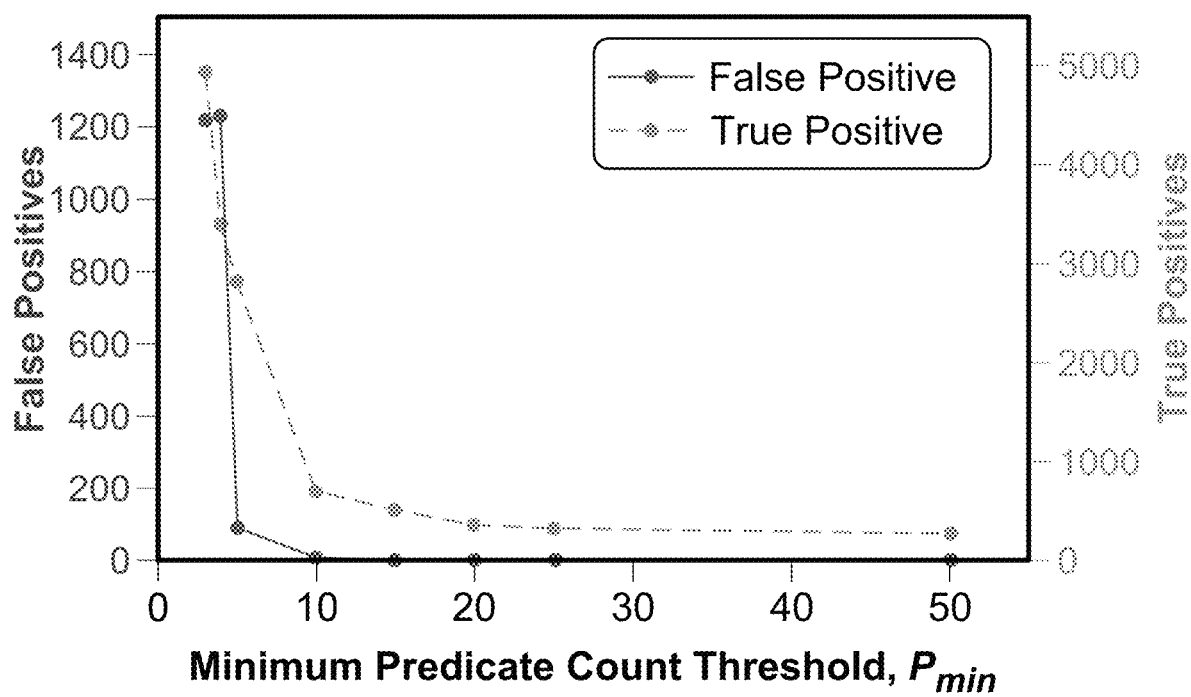
FIG. 4I is a graph of the minimum predicate count Threshold, $P_{min}$, in accordance with some embodiments.

Minimum predicate count threshold $P_{min}$. FIG. 4I is a graph of the minimum predicate count Threshold, $P_{min}$, in accordance with some embodiments. We followed the same strategy as in the prior paragraph to choose the optimal value for this parameter, as shown in FIG. 4I. From the observed values, we picked 5 for this parameter.

5.5 Signatures Generated

With the selected parameters from the prior section, we applied our algorithm on our collected predicates from the beginning to the 90th percentile by the chronological order of the predicates' extraction as discussed earlier. During our predicates ordering phase, we processed 1.5 billion predicates and consumed 50,000 predicates for our signature generation phase (e.g., this number was bound by our selected parameters in the above section). This step using our deployment setup (see § 4.3) completed in 1 minute 39 seconds. In our signature generation phase, we retrieved and consumed 14.5 million URL-predicate pairs from 309,721 malicious URLs, which was the biggest time consuming process in our case with 20 minutes 32 seconds. FIG. 4J illustrates Table 4 that indicates the time taken to perform each stage of the signature generation and application (e.g., on a machine with a 12-core Intel i7 3.2 GHz processor and 32 GB of memory) in accordance with some embodiments. Specifically, Table 4 shows the individual process times for the described example implementation. After generating signatures and performing filtering, we ended up with 379 signatures from our data.

FIG. 4K illustrates a Table 5 that includes a breakdown of predicate types in generated signatures in accordance with some embodiments. The signatures had 24,086 predicates in total, of which 21,067 (87%) were static, and 3,019 (13%) were dynamic API call predicates. The most specific signature consisted of 3,761 predicates, and the least specific one had 5 predicates (e.g., which was bound by our signature filtering parameter $P_{min}$, as discussed in § 5.4), with an average of ~64 and a median of 13 predicates per generated signature. Of the generated signatures, 183 (48%) had at least one API call predicate, and 196 (52%) consisted only of static predicates. There were only three signatures that solely contained dynamic API call predicates. Out of the ten types of predicates extracted and collected, our generated signatures consisted of six types. Table 5 shows the predicate types and their frequency in our generated signatures as shown in FIG. 4K.

6 Evaluating Generated Signatures

We relied on two strategies to evaluate our synthesized signatures. First, we apply our signatures over a set of labeled data and see how they perform. Second, we apply our signatures on completely unlabeled data in the wild and use a third-party oracle to evaluate our detection results. As shown in FIG. 4L, Table 6 shows the breakdown of the collected predicates used for each process in percentiles of chronological ordering as mentioned in § 5.4.

6.1 Labeled Data-Based Evaluation

We applied the 379 generated signatures in § 5 over the last ten percentiles of our labeled predicates (e.g., from $91^{st}$ to $100^{th}$ percentile by chronological order of extraction as mentioned in § 5.4). In essence, this implies how signatures synthesized from previous data perform on detecting unseen future data. We found 8,067 unique URL matches over 192 signatures in our last ten percentile data, with 41 labeled benign (e.g., from 41 matches) and 8,026 labeled malicious (e.g., from 8,028 matches). If we consider the number of labeled URLs in our application dataset, we have a false-positive rate of 0.008% and our generated campaign signatures covered 6.71% of the labeled malicious data (e.g., this is without considering that about one-third of our labeled malicious URLs did not have any predicates). This signature application completed in 1 minute 53 seconds (e.g., see Table 4 as shown in FIG. 4J).

FIG. 4M illustrates a Table 7 that includes the top ten campaign signatures with the highest toxicity in accordance with some embodiments. We also applied our signatures on our data to synthesize the signatures themselves in a regressive manner to evaluate coverage. While applying the signatures on the data used for generation (e.g., from first to 90th percentile of our labeled data) resulted in 28,401 unique malicious URLs (e.g., from 28,470 matches) over 364 signatures, there were no false positives. We sorted the signatures by their detection count to find the campaigns with the highest toxicity rate and manually examined the top ten human-readable signatures to determine what kind of campaigns we were detecting, as shown in Table 7 of FIG. 4M.

6.2 Unlabeled Data-based Evaluation

As described in § 4, along with labeled data, we also collected approximately 147 million predicates from about 431,000 unlabeled URLs from a list of diverse sources as mentioned in § 4.4. We wanted to see how our generated signatures would perform when it comes to finding malicious campaigns in the wild. After applying the 379 signatures over our unlabeled dataset, we found 483 matches from 34 signatures. This signature application took 1 minute 21 seconds (e.g., see Table 4 of FIG. 4J).

We had 471 unique URLs from the matches of unlabeled data. We also performed a cross-check to find that none of the 471 URLs were matched from any of the 29 signatures that had at least one false positive during our labeled data-base evaluation.

To further verify our detection, we used VirusTotal [40], an ensemble malicious detector for both URLs and binary files. VirusTotal provides detection results from an array of oracles. Out of the 471 URLs submitted to VirusTotal, we got 286 URLs (60.72%) that at least one VirusTotal oracle was able to identify having malicious activity, 182 URLs with high confidence (e.g., where >=3 oracles reported malicious behavior).

However, for the 185 URLs where VirusTotal did not report any malicious activity, we manually checked to confirm all 185 URLs that they were either serving a scant benign page, or simply not alive. Given that a substantial portion of our detected campaigns is simply scams and phishing sites subject to block-listing, these sites are often ephemeral and are either quickly taken down or moved to another random domain upon being flagged by block-lists. To determine what kind of malicious content they were serving during our crawling, if any, we again resorted to manually inspecting the human-readable signatures that matched them along with other predicates collected from these URLs. FIG. 4N illustrates a Table 8 that includes a breakdown of manual analysis of URLs not flagged by VirusTotal in accordance with some embodiments. We were quickly able to identify that these URLs were indeed serving malicious contents involving various scams (credit card mining, lottery, dating site gathering personal info, fake survey, newsletter unsubscribe, etc.), phishing (amazon card, Paypal business, Paypal pay in terms, domain hosting, etc.), and JavaScript malware as displayed in Table 8 of FIG. 4N.

To estimate the impact of our detection in the wild, we cross-checked our detected URLs against the enterprise customers' request logs since September of 2021 from our partnering cybersecurity company. We found that 132 (28.03%) of our 471 unlabeled URLs detected through our signatures did show up in the customer logs, and were targeting enterprise customers. A total of 80,472 requests from 5,136 users were made to these 132 URLs, with an average of 610 requests per detected URL made, and an average of 16 requests made per user to these detected URLs. FIG. 4O illustrates a Table 9 that provides an impact of detected URLs from unlabeled data over enterprise customer request logs (e.g., since September 2021) in accordance with some embodiments. Specifically, Table 9 shows the breakdown of detected URLs across the customer log data for both VirusTotal and our manual inspection.

6.3 Signature Case Studies

In this section, we provide case studies from our synthesized signatures to demonstrate the human-readability aspect and their efficiency to detect campaigns.

Figure 5:
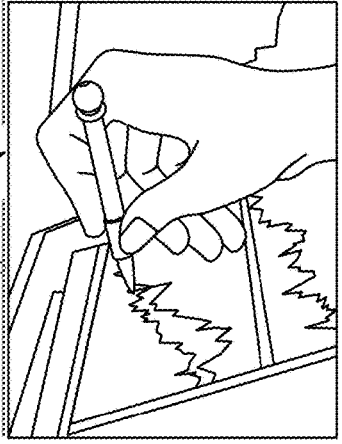
FIG. 5 is a screen diagram that shows an example of one of these URLs associated with a clickjacking campaign.

Case Study 1: clickjacking campaign. FIG. 4P provides a Listing 1 that displays a shortened version of our generated signature that successfully identified a clickjacking campaign (e.g., a clickjacking scam) in accordance with some embodiments. In this particular clickjacking campaign, the user is duped into clicking on an element that is removed soon after, deceiving the user that the mouse click did not take place. We identified the signature match over four URLs with different domains. FIG. 5 is a screen diagram that shows an example of one of these URLs associated with a clickjacking campaign.

Case Study 2: history manipulation campaign. FIG. 4Q provides a Listing 2 that displays a shortened version of our generated signature that successfully identified a JavaScript (JS) malware campaign (e.g., manipulating browsing history) in accordance with some embodiments. In this particular malicious campaign, the web page stuffs the user's tab history while performing a number of redirects and eventually landing on one of the random landing pages. When the user tries the back button on the browser, the user ends up visiting the corrupt URLs in their history pushed by the initial page. We matched this particular campaign signature across 332 URLs over multiple distinct domains. The identifying signature is displayed in shortened form in Listing 2 of FIG. 4Q.

7 Discussion

Comparison to ML-models. As shown in Table 4 of FIG. 4J, our signature synthesizing process takes approximately 22 minutes in total to generate signatures from 1.5 billion predicates. This is considerably fast when it comes to reacting to evolving campaigns. We can easily update our signatures or append to the existing signature pool by simply generating signatures from newly available data. Retraining real-world ML-models is expensive and can only be done over a certain period of time. Moreover, the generated signatures are easily interpretable, the predicates that are present in a signature are simple text. As such, the effort required to retrain or tune the signature generation process is significantly less in contrast to an ML-based model.

Understanding and eliminating false positives. We had 41 benign URLs matched by 29 signatures during our labeled data-based evaluation, as described in § 6.1. We manually inspected the rules to understand why these false positives occurred. As the signatures were synthesized from past data and were applied to future data, we ended up with discriminating predicates in the first phase of our algorithm that were observed on both benign and malicious URLs. This is entirely possible when malicious URLs load content from benign sources (e.g., often to feign or mimic benign URLs), but our synthesizing data set does not have a presence of these benign URLs with the same content. Thus, during our discriminating predicate set construction algorithm (see Algorithm 1 as shown in FIG. 4F), these predicates do not get rejected, as we reject any predicate that we observe on any benign data during this phase, and end up in the discriminating predicate set that gets passed on to the signature synthesizing phase.

Due to the slicing of our dataset along the temporal lines, we did not have benign URLs with these particular predicates during our synthesizing process and this resulted in false positives. This scenario is also confirmed by the total absence of false positives during our regression matching stage, where we applied generated signatures on the same data used for generation. Based on this observation, we recommend collecting benign data from diverse sources to eliminate any potential false-positives and construct robust signatures, including benign URLs beyond that of popular URL lists such as Alexa and Tranco.

Making the predicates more abstract. To further increase the repeating behavior detection, it is possible to make the behavior predicates more abstract, so they are more generalized. Certain behavior predicates such as HTML text, HTML URL, traffic URL, and even API calls use strings that contain specific information such as phone numbers, specific location names, and product names. If we could make these portions of the predicates abstract, then we would end up with predicates that tend to be much more generalized and likely to be contributing greatly in the set of discriminating predicates.

Comprehensiveness of generated signatures. One of the most important characteristics of our generated signatures is they are complete and are capable of detecting all campaigns without missing any in the given data. As described in § 5, we find the most discriminative predicates with the highest frequency in our extracted predicates, and use this set of discriminative set of predicates in the next step to synthesize our signatures through our rlgg-inspired algorithm.

The only way we would be missing a malicious campaign in our data is when there is an extremely low number of URLs belonging to that campaign within our data. In this scenario, it is possible that the predicates extracted from these particular campaign URLs would lack in either the frequency or the discriminative properties, thus it would not be considered during the latter part of our signature generation algorithm. In this case, we simply point out that without enough repeating behavior, any malicious activity is just a random malicious activity to our cause.

However, as we encounter further URLs from the same campaign, we would be able to have enough repeating behavior and by simply tuning the algorithm parameters correctly as described in § 5.4, we would end up considering predicates from these URLs into our signature generation and synthesize a signature for this campaign. Since our signature generation process is simple enough and can be used for newer extracted predicates very easily, we can identify and generate signatures for newer campaigns.

Signature longevity. As the generated signatures are from extracted behaviors on the web page itself, it could be argued that adversaries can change the footprint of the malicious activity on the web page to evade the signatures previously generated. But, in a mass-scale malicious campaign this is not trivial. The adversary however can limit the number of URLs the campaign is propagated on to evade our detection. However, this significantly reduces the effectiveness of the campaign. Even if the signatures are considered brittle for detection, we can definitely generate newer signatures from the changed behavior of the attackers with ease. And in a continuous detection system deployment, we recommend signature expiration and newer signature generation from continuous predicate extraction from incoming URLs as explained in the following paragraph.

Continuous signature generation. As our campaign detection relies upon repeated behavior in the wild and most campaigns are ephemeral and continuously shift behavior, it is important that we keep updating our pool of signatures by continuously extracting predicates and generating signatures from them. Based on detection frequency and accuracy, we can retire signatures from our pool, and update our signature pool in a periodical manner. This should ensure updated signatures for detection in a constantly changing web ecosystem.

8 Related Work

Numerous research work has explored the domain of JS-based malware identification focusing on specific behaviors such as drive-by downloads [5], evasive JS malware [16, 19], obfuscated JS malware [8, 9, 15, 41], and other in-browser JS malware detection systems [6, 7, 30]. However, these research works primarily focus on detecting JS malware rather than their campaign aspect. A handful of research has looked into detecting campaigns at scale and the similarity of web-based malware behavior. In Prophiler [3], Canali et al. proposed a supervised fast filtering system for malicious web page categorization. Starov et al. used behavioral analysis to detect malicious campaigns in obfuscated JS [35]. Vadrevu et al. detected social engineering attack campaigns in low-tier ad networks [39]. Starov et al. identified malicious web campaigns through shared web analytic IDs among malicious web sites [36]. Compared to these works, in our work, we are proposing an automated system to generate signatures for malicious web campaigns regardless of any particular type that does not require any highly targeted or correlated data for training, and our detection signatures can easily be applied for further detection.

There are a number of prior research works that focus on detecting malicious campaign web pages based on URL redirection chains and scams. There are works on scam campaign detection that focus on survey scams, tech-support scams, and fraudulent scams on free live-streaming services [17, 22, 29, 34]. SpiderWeb [37] constructs HTTP redirection graphs and extracts features of multiple categories to feed into a Support Vector Machine (SVM) classifier. Similarly, Surf [21] uses a J48 classifier on extracted features from poisoned search engine redirection graphs for detecting these URLs. WarningBird [20] is based on a SVM classifier on features extracted from URLs extracted from Twitter feeds. These works rely heavily on features extracted from behaviors that are used for training the supervised classifier. In contrast, the disclosed techniques described in our work are generating transparent and easy-to-apply signatures instead of opaque machine learning models for detection of multiple categories of malicious web campaigns.

9 Conclusion

Accordingly, an automated system is disclosed that can generate human-interpretable signatures for identifying malicious web campaigns at scale. We demonstrated that the disclosed automated system could handle large amounts of data and generated signatures in short time, making the synthesizing process inexpensive to run periodically and keeping our signature pool up to date. Furthermore, we can apply our generated signatures to detect URLs belonging to a campaign considerably fast. The disclosed techniques can be used in multiple ways in a real-world scenario, where our generated signatures can be used in tandem with other detection systems to either augment them or complement them in an ensemble detection system. Alternatively, the disclosed techniques can be used on their own to trace down domains propagating web-based malicious campaign contents to enrich existing blocking list services. From either perspective, the disclosed techniques provide valuable insight into the constantly morphing ecosystem of malicious web campaigns.

Various process embodiments for automated generation of behavioral signatures for malicious web campaigns will now be further described below.

Figure 6:
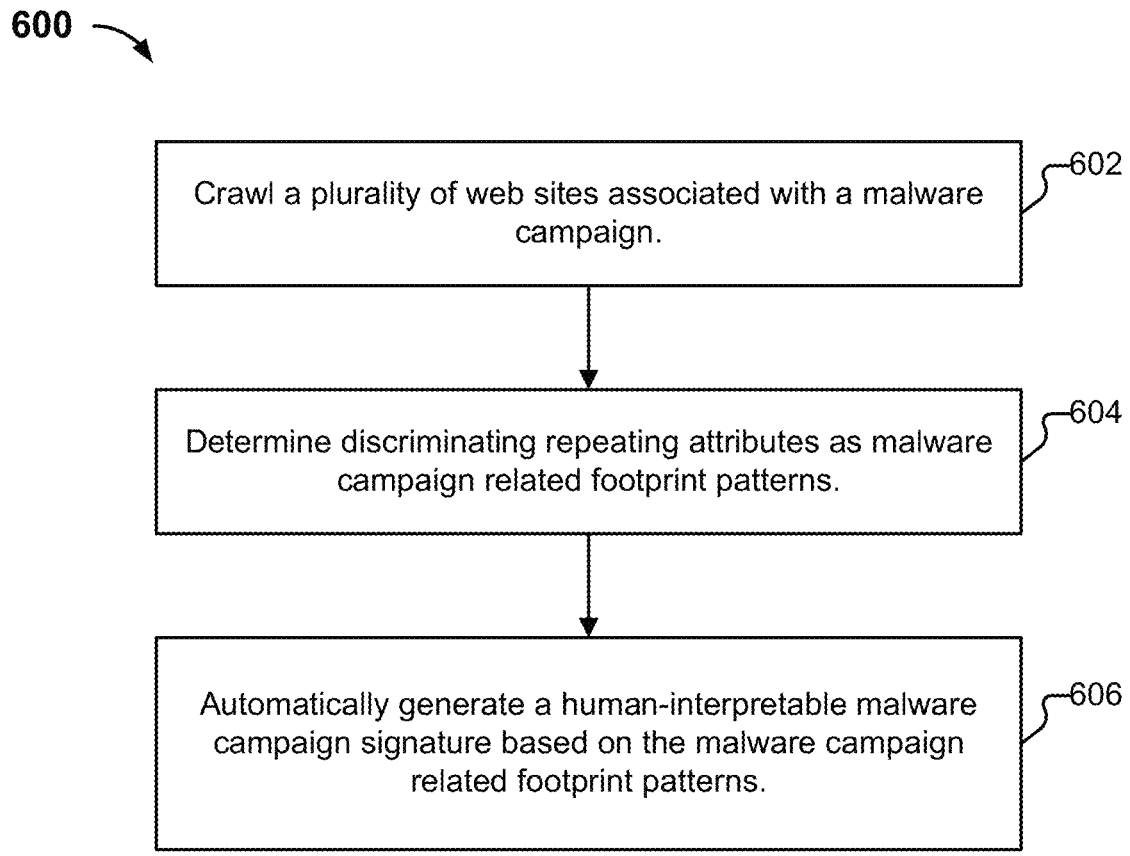
FIG. 6 is a flow diagram of a process for automated generation of behavioral signatures for malicious web campaigns in accordance with some embodiments.

Example Processes for Automated Generation of Behavioral Signatures for Malicious Web Campaigns FIG. 6 is a flow diagram of a process for automated generation of behavioral signatures for malicious web campaigns in accordance with some embodiments. In some embodiments, a process 600 as shown in FIG. 6 is performed by the security platform and techniques as similarly described above including the embodiments described above with respect to FIGS. 1-5. In one embodiment, process 600 is performed (e.g., in whole or in part) by data appliance 102 as described above with respect to FIG. 1, security platform 122 as described above with respect to FIG. 1 (e.g., as a cloud-based security service or also referred to herein as a cloud security service), a virtual appliance (e.g., Palo Alto Networks' VM Series virtualized next generation firewalls, CN Series container next generation firewalls, and/or other commercially available virtual-based or container-based firewalls can similarly be implemented and configured to perform the disclosed techniques), an SDN security solution, a cloud security service, and/or combinations or hybrid implementations of the aforementioned as described herein.

At 602, crawling a plurality of web sites associated with a malware campaign is performed, such as similarly described above with respect to FIGS. 1 and 4A-4R.

At 604, discriminating repeating attributes are determined as malware campaign related footprint patterns (e.g., at a cloud security service), in which the discriminating repeating attributes are not associated with benign web sites, such as similarly described above with respect to FIGS. 4A-R.

In an example implementation, a browser environment (e.g., a Chromium browser environment or another browser environment) can be instrumented for tracking dynamic behaviors. Specifically, the instrumented browser environment can be configured to crawl a plurality of uncategorized, labeled Uniform Resource Links (URLs) to generate malware campaign signatures. Such malware campaigns can be associated with a set of domains (e.g., URLs) used by an attacker for a malicious activity, such as phishing, Uniform Resource Link (URL) delivered malware, and/or other malicious related activity.

At 606, a human-interpretable malware campaign signature is automatically generated based on the malware campaign related footprint patterns (e.g., the human-interpretable malware campaign signature can detect that another web site is associated with the malware campaign even if the another web site includes content that is encrypted and/or obfuscated), such as similarly described above with respect to FIGS. 4A-R.

For example, the automatically generated human-interpretable malware campaign signature can be applied to identify another malicious web site belonging to the malware campaign by applying the malware campaign signature on both labeled and unlabeled Uniform Resource Links (URLs) associated with a plurality of web sites.

Figure 7:
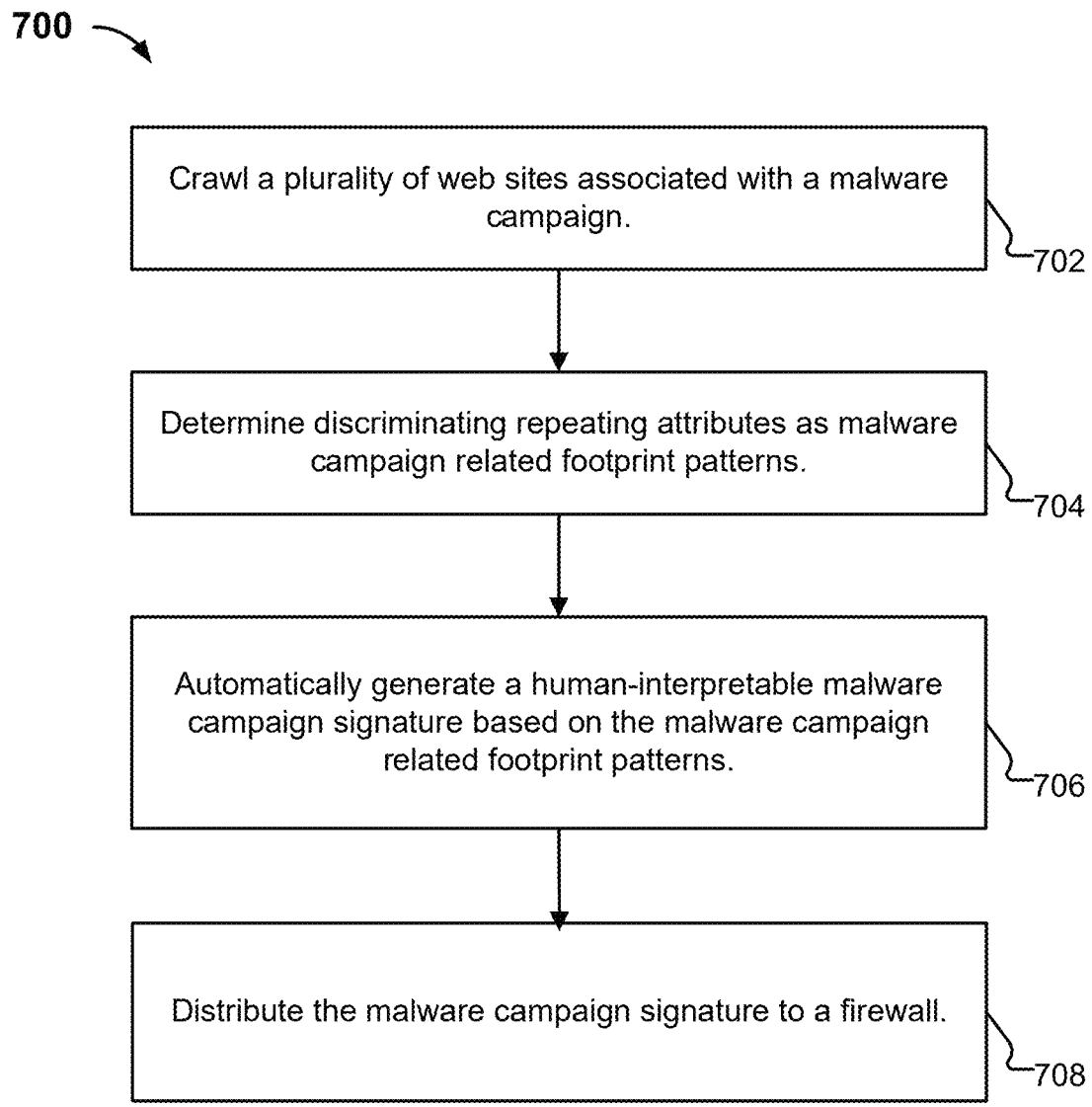
FIG. 7 is another flow diagram of a process for automated generation of behavioral signatures for malicious web campaigns in accordance with some embodiments.

FIG. 7 is a flow diagram of a process for automated generation of behavioral signatures for malicious web campaigns in accordance with some embodiments. In some embodiments, a process 700 as shown in FIG. 7 is performed by the security platform and techniques as similarly described above including the embodiments described above with respect to FIGS. 1-5. In one embodiment, process 700 is performed (e.g., in whole or in part) by data appliance 102 as described above with respect to FIG. 1, security platform 122 as described above with respect to FIG. 1 (e.g., as a cloud-based security service), a virtual appliance (e.g., Palo Alto Networks' VM Series virtualized next generation firewalls, CN Series container next generation firewalls, and/or other commercially available virtual-based or container-based firewalls can similarly be implemented and configured to perform the disclosed techniques), an SDN security solution, a cloud security service, and/or combinations or hybrid implementations of the aforementioned as described herein.

At 702, crawling a plurality of web sites associated with a malware campaign is performed, such as similarly described above with respect to FIGS. 1 and 4A-4R.

At 704, discriminating repeating attributes are determined as malware campaign related footprint patterns (e.g., at a cloud security service), in which the discriminating repeating attributes are not associated with benign web sites, such as similarly described above with respect to FIGS. 4A-R.

At 706, a human-interpretable malware campaign signature is automatically generated based on the malware campaign related footprint patterns (e.g., the human-interpretable malware campaign signature can detect that another web site is associated with the malware campaign even if the another web site includes content that is encrypted and/or obfuscated), such as similarly described above with respect to FIGS. 4A-R. For example, the malware campaign signature can also be periodically updated for accurately detecting the malware campaign (e.g., which can have evolving attributes over time), such as similarly described above. As another example, a new human-interpretable malware campaign signature can be automatically generated for a new malware campaign as also similarly described above.

At 708, the malware campaign signature is distributed to a firewall (e.g., or another security entity/platform). The firewall can be configured to apply the malware campaign signature based on monitored network traffic activity. As such, a visited web site can be detected to be associated with the malware campaign based on an identical match or a threshold match with the malware campaign signature.

For example, the malware campaign signature can be applied by a firewall (e.g., or any security entity/platform) for a match on a candidate web page. Specifically, predetermined behavior predicates can be extracted from the web page to determine whether all or a threshold number (e.g., a fuzzy match) of the behavior predicates in the malware campaign signature are present in the set of extracted predicates from the web page. If a match is detected, then the candidate web page is determined to be associated with the malware campaign. As such, the firewall can then perform an action based on detecting that the web page is associated with the malware campaign (e.g., block access to the candidate web page, generate an alert, log an attempt to access the candidate web page, quarantine an endpoint associated with a request for the candidate web page, and/or another action can be performed).

REFERENCES

[1] alexa.com. Alexa Top Sites. https://www.alexa.com/topsites. Accessed: 11-28-2021.
[2] Stefano Calzavara, Sebastian Roth, Alvise Rabitti, Michael Backes, and Ben Stock. A tale of two headers: A formal analysis of inconsistent click-jacking protection on the web. In Proceedings of the USENIX Security Symposium, 2020.
[3] Davide Canali, Marco Cova, Giovanni Vigna, and Christopher Kruegel. Prophiler: A Fast Filter for the Large-Scale Detection of Malicious Web Pages. In Proceedings of the International World Wide Web Conference (WWW), 2011.
[4] Mihai Christodorescu, Somesh Jha, Sanjit A Seshia, Dawn Song, and Randal E Bryant. Semantics-aware malware detection. In Proceedings of the IEEE Symposium on Security and Privacy, 2005.
[5] Marco Cova, Christopher Kruegel, and Giovanni Vigna. Detection and analysis of drive-by-download attacks and malicious JavaScript code. In Proceedings of the International World Wide Web Conference (WWW), 2010.
[6] Charlie Curtsinger, Benjamin Livshits, Benjamin G. Zorn, and Christian Seifert. Zozzle: Fast and precise in-browser JavaScript malware detection. In Proceedings of the USENIX Security Symposium, 2011.
[7] Manuel Egele, Christopher Kruegel, Engin Kirda, Heng Yin, and Dawn Song. Dynamic spyware analysis. In Proceedings of the USENIX Annual Technical Conference, 2007.
[8] Aurore Fass, Michael Backes, and Ben Stock. HideNoSeek: Camouflaging Malicious JavaScript in Benign ASTs. In Proceedings of the ACM Conference on Computer and Communications Security (CCS), 2019.
[9] Aurore Fass, Robert P Krawczyk, Michael Backes, and Ben Stock. Jast: Fully syntactic detection of malicious (obfuscated) JavaScript. In International Conference on Detection of Intrusions and Malware, and Vulnerability Assessment, 2018.
[10] Matthias Feurer and Frank Hutter. Hyperparameter optimization. Springer, Cham, 2019.
[11] Matt Fredrikson, Somesh Jha, Mihai Christodorescu, Reiner Sailer, and Xifeng Yan. Synthesizing near-optimal malware specifications from suspicious behaviors. In Proceedings of the IEEE Symposium on Security and Privacy, 2010.
[12] Github. Puppeteer. https://github.com/GoogleChrome/puppeteer. Accessed: 09-28-2021.

[13] github.io. Chrome DevTools Protocol Viewer. https://chromedevtools.github.io/devtools-protocol/. Accessed: 09-28-2021.

[14] Jordan Jueckstock and Alexandros Kapravelos. VisibleV8: In-browser monitoring of javascript in the wild. In Proceedings of the ACM SIGCOMM Internet Measurement Conference (IMC), 2019.

[15] Scott Kaplan, Benjamin Livshits, Benjamin Zorn, Christian Siefert, and Charlie Curtsinger. "NOFUS: Automatically Detecting"+String.fromCharCode(32)+"ObFuSCateD". To LowerCase ( )+"JavaScript Code. In Technical report, Technical Report MSR-TR 2011-57, Microsoft Research, 2011.

[16] Alexandros Kapravelos, Yan Shoshitaishvili, Marco Cova, Christopher Kruegel, and Giovanni Vigna. Revolver: An automated approach to the detection of evasive web-based malware. In Proceedings of the USENIX Security Symposium, 2013.

[17] Amin Kharraz, William Robertson, and Engin Kirda. Surveylance: automatically detecting online survey scams. In Proceedings of the IEEE Symposium on Security and Privacy. IEEE, 2018.

[18] Clemens Kolbitsch, Paolo Milani Comparetti, Christopher Kruegel, Engin Kirda, Xiao-yong Zhou, and XiaoFengWang. Effective and efficient malware detection at the end host. In Proceedings of the USENIX Security Symposium, 2009.

[19] Clemens Kolbitsch, Benjamin Livshits, Benjamin Zorn, and Christian Seifert. Rozzle: De-cloaking Internet malware. In Proceedings of the IEEE Symposium on Security and Privacy, 2012.

[20] Sangho Lee and Jong Kim. WarningBird: A near real-time detection system for suspicious URLs in Twitter stream. IEEE transactions on dependable and secure computing, 2013.

[21] Long Lu, Roberto Perdisci, and Wenke Lee. Surf: detecting and measuring search poisoning. In Proceedings of the ACM Conference on Computer and Communications Security (CCS), 2011.

[22] Najmeh Miramirkhani, Oleksii Starov, and Nick Nikiforakis. Dial one for scam: A large-scale analysis of technical support scams. In Proceedings of the Symposium on Network and Distributed System Security (NDSS), 2017.

[23] Stephen Muggleton and Wray Buntine. Machine invention of first order predicates by inverting resolution. In Machine Learning Proceedings. Elsevier, 1988.

[24] Stephen Muggleton, Cao Feng, et al. Efficient induction of logic programs. Citeseer, 1990.

[25] Adam Oest, Penghui Zhang, Brad Wardman, Eric Nunes, Jakub Burgis, Ali Zand, Kurt Thomas, Adam Doupé, and Gail-Joon Ahn. Sunrise to sunset: Analyzing the end-to-end life cycle and effectiveness of phishing attacks at scale. In Proceedings of the USENIX Security Symposium, 2020.

[26] Gordon Plotkin. Automatic methods of inductive inference. Ph.D. Thesis, 1972.

[27] Gordon D Plotkin. A further note on inductive generalization. Machine intelligence, 1971.

[28] J. Ross Quinlan. Learning logical definitions from relations. Machine learning, 1990.

[29] M Zubair Rafique, Tom Van Goethem, Wouter Joosen, Christophe Huygens, and Nick Nikiforakis. It's free for a reason: Exploring the ecosystem of free live streaming services. In Proceedings of the Symposium on Network and Distributed System Security (NDSS), 2016.

[30] Paruj Ratanaworabhan, V. Benjamin Livshits, and Benjamin G. Zorn. Nozzle: A defense against heap-spraying code injection attacks. In Proceedings of the USENIX Security Symposium, 2009.

[31] safebrowsing.google.com/. VirusTotal—Making the world's information safely accessible. https://safebrowsing.google.com/. Accessed: 11-28-2021.

[32] Claude Sammut and Ranan B Banerji. Learning concepts by asking questions. Machine learning: An artificial intelligence approach, 1986.

[33] Ehud Yehuda Shapiro. Algorithmic program debugging. Yale University, 1982.

[34] Bharat Srinivasan, Athanasios Kountouras, Najmeh Miramirkhani, Monjur Alam, Nick Nikiforakis, Manos Antonakakis, and Mustaque Ahamad. Exposing search and advertisement abuse tactics and infrastructure of technical support scammers. In Proceedings of the International World Wide Web Conference (WWW), 2018.

[35] Oleksii Starov, Yuchen Zhou, and Jun Wang. Detecting malicious campaigns in obfuscated javascript with scalable behavioral analysis. In 2019 IEEE Security and Privacy Workshops (SPW), 2019.

[36] Oleksii Starov, Yuchen Zhou, Xiao Zhang, Najmeh Miramirkhani, and Nick Nikiforakis. Betrayed by your dashboard: Discovering malicious campaigns via web analytics. In Proceedings of the International World Wide Web Conference (WWW), 2018.

[37] Gianluca Stringhini, Christopher Kruegel, and Giovanni Vigna. Shady paths: Leveraging surfing crowds to detect malicious web pages. In Proceedings of the ACM Conference on Computer and Communications Security (CCS), 2013.

[38] tranco-list.eu. Tranco—A Research-Oriented Top Sites Ranking Hardened Against Manipulation. https://tranco-list.eu/. Accessed: 11-28-2021.

[39] Phani Vadrevu and Roberto Perdisci. What you see is not what you get: Discovering and tracking social engineering attack campaigns. In Proceedings of the ACM SIGCOMM Internet Measurement Conference (IMC), 2019.

[40] virustotal.com. VirusTotal—Analyze suspicious files and URLs to detect types of malware, automatically share them with the security community. https://www.virustotal.com/gui/home/upload. Accessed: 11-28-2021.

[41] Wei Xu, Fangfang Zhang, and Sencun Zhu. Jstill: Mostly static detection of obfuscated malicious JavaScript code. In Proceedings of the third ACM conference on Data and application security and privacy—CODASPY, 2013.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a memory configured to provide instructions; and
a processor coupled to the memory and configured to:
crawl a plurality of web sites associated with a malware campaign for behavior related and static related attributes;
determine behavior related and static related discriminating repeating attributes as malware campaign related footprint patterns, wherein the discriminating repeating attributes are associated with more than one of the crawled web sites and are not associated with benign web sites, wherein the behavior related discriminating repeating attributes are based on browser application programming interface (API) calls from dynamic execution;

automatically generate a transparently human-interpretable malware campaign signature represented in plain text based on the malware campaign related footprint patterns; and distribute the malware campaign signature to a firewall, wherein the firewall is configured to apply the malware campaign signature based on monitored network traffic activity, and wherein a visited web site is detected to be associated with the malware campaign based on a match with the malware campaign signature.

2. The system of claim 1, wherein the discriminating repeating attributes include behavior related attributes associated with dynamic content that affects the user's experience visiting the web site and static related attributes associated with static content that is visible to the user during the visit.

3. The system of claim 1, wherein the discriminating repeating attributes include behavior related attributes associated with dynamic content that affects the user's experience when visiting the web site and determined using dynamic analysis and static related attributes associated with static content that is visible to the user during the visit and determined using static analysis.

4. The system of claim 1, wherein a browser environment is instrumented for tracking dynamic behaviors, and wherein the browser environment is configured to crawl a plurality of uncategorized, labeled Uniform Resource Links (URLs) to generate malware campaign signatures.

5. The system of claim 1, wherein the malware campaign is associated with a set of domains used by an attacker for a malicious activity including phishing, Uniform Resource Link (URL) delivered malware, and/or other malicious related activity.

6. The system of claim 1, wherein the malware campaign is associated with a set of web sites used by an attacker for a malicious activity, and wherein the malicious activity includes phishing, web site delivered malware, and/or other malicious related activity.

7. The system of claim 1, wherein the human-interpretable malware campaign signature detects that another web site is associated with the malware campaign even if the another web site includes content that is encrypted and/or obfuscated.

8. The system of claim 1, wherein the automatically generated human-interpretable malware campaign signature identifies another malicious web site belonging to the malware campaign by applying the malware campaign signature on both labeled and unlabeled Uniform Resource Links (URLs) associated with the plurality of web sites.

9. The system of claim 1, wherein the processor is further configured to:
periodically update the human-interpretable malware campaign signature for the malware campaign.

10. The system of claim 1, wherein the processor is further configured to:
generate a new human-interpretable malware campaign signature for a new malware campaign.

11. The system of claim 1, wherein the processor is further configured to:

distribute the malware campaign signature to a firewall, wherein the firewall is configured to apply the malware campaign signature based on monitored network traffic activity.

12. The system of claim 1, wherein the match is a threshold match with the malware campaign signature.

13. A method, comprising:
crawling a plurality of web sites associated with a malware campaign for behavior related and static related attributes;
determining behavior related and static related discriminating repeating attributes as malware campaign related footprint patterns, wherein the discriminating repeating attributes are associated with more than one of the crawled web sites and are not associated with benign web sites, wherein the behavior related discriminating repeating attributes are based on browser application programming interface (API) calls from dynamic execution;
automatically generating a transparently human-interpretable malware campaign signature represented in plain text based on the malware campaign related footprint patterns; and
distributing the malware campaign signature to a firewall, wherein the firewall is configured to apply the malware campaign signature based on monitored network traffic activity, and wherein a visited web site is detected to be associated with the malware campaign based on a match with the malware campaign signature.

14. The method of claim 13, wherein the discriminating repeating attributes include behavior related attributes and static related attributes.

15. The method of claim 13, wherein the discriminating repeating attributes include behavior related attributes determined using dynamic analysis and static related attributes determined using static analysis.

16. The method of claim 13, wherein a browser environment is instrumented for tracking dynamic behaviors, and wherein the browser environment is configured to crawl a plurality of uncategorized, labeled Uniform Resource Links (URLs) to generate malware campaign signatures.

17. The method of claim 13, wherein the malware campaign is associated with a set of domains used by an attacker for a malicious activity including phishing, Uniform Resource Link (URL) delivered malware, and/or other malicious related activity.

18. The method of claim 13, wherein the malware campaign is associated with a set of web sites used by an attacker for a malicious activity, and wherein the malicious activity includes phishing, web site delivered malware, and/or other malicious related activity.

19. A computer program product embodied in a non-transitory computer readable medium and comprising computer instructions for:
crawling a plurality of web sites associated with a malware campaign for behavior related and static related attributes;
determining behavior related and static related discriminating repeating attributes as malware campaign related footprint patterns, wherein the discriminating repeating attributes are associated with more than one of the crawled web sites and are not associated with benign web sites, wherein the behavior related discriminating repeating attributes are based on browser application programming interface (API) calls from dynamic execution;

automatically generating a transparently human-interpretable malware campaign signature represented in plain text based on the malware campaign related footprint patterns; and distributing the malware campaign signature to a firewall, wherein the firewall is configured to apply the malware campaign signature based on monitored network traffic activity, and wherein a visited web site is detected to be associated with the malware campaign based on a match with the malware campaign signature.

20. The method of claim 13, wherein the automatically generated human-interpretable malware campaign signature identifies another malicious web site belonging to the malware campaign by applying the malware campaign signature on both labeled and unlabeled Uniform Resource Links (URLs) associated with the plurality of web sites.

* * * * *